(12) United States Patent
Okamoto et al.

(10) Patent No.: US 8,957,181 B2
(45) Date of Patent: Feb. 17, 2015

(54) PREPARATION PROCESS FOR CYCLIC CONJUGATED POLYMER AND POLYMERIZATION CATALYST FOR CYCLIC CONJUGATED POLYMER

(75) Inventors: Syuji Okamoto, Sayama (JP); Hikaru Meguro, Sayama (JP); Atsunori Mori, Kobe (JP)

(73) Assignees: Soken Chemical & Engineering Co., Ltd., Tokyo (JP); National University Corporation Kobe University, Hyogo (JP)

( * ) Notice: Subject to any disclaimer, the term of this patent is extended or adjusted under 35 U.S.C. 154(b) by 0 days.

(21) Appl. No.: 14/122,468

(22) PCT Filed: May 21, 2012

(86) PCT No.: PCT/JP2012/062931
§ 371 (c)(1),
(2), (4) Date: Nov. 26, 2013

(87) PCT Pub. No.: WO2012/165194
PCT Pub. Date: Dec. 6, 2012

(65) Prior Publication Data
US 2014/0107303 A1 Apr. 17, 2014

(30) Foreign Application Priority Data
May 27, 2011 (JP) ................................. 2011-119462

(51) Int. Cl.
C08G 75/00 (2006.01)
C08G 61/12 (2006.01)
C08G 61/10 (2006.01)

(52) U.S. Cl.
CPC .............. *C08G 61/126* (2013.01); *C08G 61/10* (2013.01); *C08G 2261/3223* (2013.01); *C08G 2261/417* (2013.01)
USPC ............................ 528/377; 528/378; 528/380

(58) Field of Classification Search
USPC .......................................... 528/377, 378, 380
See application file for complete search history.

(56) References Cited

U.S. PATENT DOCUMENTS 6,166,172 A 12/2000 McCullough et al.
2005/0080219 A1 4/2005 Koller et al.

FOREIGN PATENT DOCUMENTS

JP 2004115695 A 4/2004
JP 3830677 B2 7/2006
(Continued)

OTHER PUBLICATIONS

Tamba et al. ,J. Am. Chem. Soc. 2011, 133, 9700-9703.*
(Continued)

*Primary Examiner* — Shane Fang
(74) *Attorney, Agent, or Firm* — The Webb Law Firm

(57) ABSTRACT

A preparation process for a cyclic conjugated polymer, includes the steps of deprotonating a monohalogenated cyclic conjugated compound of a 5- to 7-membered ring using a deprotonation catalyst comprising secondary amine represented by $R^1NHR^2$ ($R^1$ and $R^2$ are the same or different and are each a branched or cyclic alkyl group of 1 to 15 carbon atoms or a phenyl group) and a Grignard reagent represented by $R^3MgX$ (X is a halogen atom selected from chlorine, bromine and iodine, and $R^3$ is a straight-chain or branched alkyl group of 1 to 6 carbon atoms) and polymerizing the deprotonated monohalogenated cyclic conjugated compound.

11 Claims, 3 Drawing Sheets

(56) References Cited

FOREIGN PATENT DOCUMENTS

| JP | 2007501300 A | 1/2007 |
|---|---|---|
| JP | 200881748 A | 4/2008 |
| JP | 4166918 62 | 8/2008 |
| WO | 2012014844 A1 | 2/2012 |

OTHER PUBLICATIONS

Jayakannan et al., "Synthesis of Regioregular Poly(3-octylthiophene)s via Suzuki Polycondensation and End-Group Analysis by Matrix-Assisted Laser Desorption/Ionization Time-of-Flight Mass Spectrometry", Journal of Polymer Science: Part A: Polymer Chemistry, 2005, pp. 1454-1462, vol. 43.

Krasovskiy et al., "Mixed Mg/Li Amides of the Type R2NMgClLiCl as Highly Efficient Bases for the Regioselective Generation of Functionalized Aryl and Heteroaryl Magnesium Compounds", Angewandte Chemie International Edition, 2006, pp. 2958-2961, vol. 45.

Li et al., "Tris[tri(2-thienyl)phosphine]palladium as the Catalyst Precursor for Thiophene-Based Suzuki-Miyaura Crosscoupling and Polycondensation", Journal of Polymer Science: Part A: Polymer Chemistry, 2008, pp. 4556-4563, vol. 46.

McCullough et al., "Synthesis and Physical Properties of Regiochemically Well-Defined, Head-To-Tail Coupled Poly(3-Alkylthiophenes)", Synthetic Metals, 1993, pp. 1198-1203, vol. 55-57.

Piller et al., "Regio- and Chemoselective Synthesis of Fully Substituted Thiophenes", Organic Letters, 2009, pp. 445-448, vol. 11, No. 2.

Takita et al., "Synthesis of Polythiophene Derivatives Based on Direct Arlyation", The Chemical Society of Japan, Preprints 2 F1-51, 2010, 1 page.

Tanaka et al., "Generation of metalated thiophenes with Grignard reagent and catalytic secondary amine for the cross coupling reaction with aryl halides", Tetrhedron Letters, 2012, pp. 1173-1176, vol. 53.

Yokoyama et al., "Chain-Growth Polymerization for Poly(3-hexylthiophene) with a Defined Molecular Weight and a Low Polydispersity", Macromolecules, 2004, pp. 1169-1171, vol. 37.

\* cited by examiner

PREPARATION PROCESS FOR CYCLIC CONJUGATED POLYMER AND POLYMERIZATION CATALYST FOR CYCLIC CONJUGATED POLYMER

CROSS-REFERENCE TO RELATED APPLICATIONS

This application is the United States national phase of International Application No. PCT/JP2012/062931 filed May 21, 2012, and claims priority to Japanese Patent Application No. 2011-119462 filed May 27, 2011, the disclosures of which are hereby incorporated in their entirety by reference.

TECHNICAL FIELD

The present invention relates to a preparation process for a cyclic conjugated polymer and a polymerization catalyst for acyclic conjugated polymer, which can be preferably used for preparing the cyclic conjugated polymer through polymerization.

BACKGROUND ART

Cyclic conjugated polymers have electric conductivity because they have a polymer structure wherein n-conjugated electrons are connected, and further, they are excellent in processability and exhibit relatively high environmental stability and heat stability. On that account, they have been paid attention in recent years as materials capable of being used for electric parts, such as organic thin film solar cells, organic thin film transistors, photoelectric conversion materials, organic EL materials, diodes, triodes, electrooptical displays, reflection films and nonlinear optical materials.

Of the cyclic conjugated polymers, those having been paid attention as particularly promising polymers are polymers having a substituent imparting solubility in solvents, such as a hexyl group, at the position other than the main chain skeleton of the cyclic conjugated polymer. It is known that, for example, poly(3-alkylthiophene) undergoes self-assembly, and it is thought that by virtue of this, high electric charge carrier mobility is attained. It is thought that as the molecular weight distribution of poly(3-substituted thiophene) is narrowed, the molecules can undergo self-assembly with one another on a higher level. When the above electric parts are formed from poly(3-substituted thiophene), the poly(3-substituted thiophene) needs to have a molecular weight of a certain degree, from the viewpoint that the electric parts attain given strength or electric conductivity.

Various synthesis processes for such cyclic conjugated polymers have been proposed. For example, a synthesis process for poly(3-substituted thiophene), which is represented by the following chemical reaction formula, is described in a non patent literature 1.

[Chem. 1]

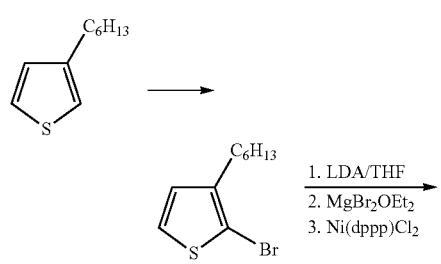

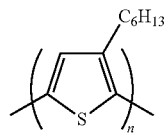

In this process, LDA for use in the step 1 needs to be formed in advance by allowing n-butyllithium and diisopropylamine to react with each other at −40° C. for 40 minutes. On the other hand, when a monomer (2-bromo-3-hexylthiophene) is added in the step 1, it is necessary to control the temperature to a low temperature of −78° C. in order to selectively abstract a proton at the 5-position in a high conversion ratio and to perform lithiation.

Thereafter, the reaction solution is stirred at −40° C. for 40 minutes, then in the step 2, a magnesium bromide-diethyl ether complex (MgBr$_2$.OEt$_2$) is added at −60° C., and the reaction solution is stirred for 20 minutes and then further stirred at −40° C. for 15 minutes. In the step 3, after Ni(dppp)Cl$_2$ (1,3-bis(diphenylphosphinopropane)nickel(II) chloride) is added to the reaction solution at −5° C., the reaction solution needs to be stirred at room temperature for 12 to 18 hours.

In a patent literature 1, a synthesis process for poly(3-substituted thiophene) having an oxazoline residue at the side chain, which is represented by the following chemical reaction formula, is described. Also in this process, LDA is allowed to react with a thiophene compound dissolved in THF and MgBr$_2$.OEt$_2$ at −98° C.

[Chem. 2]

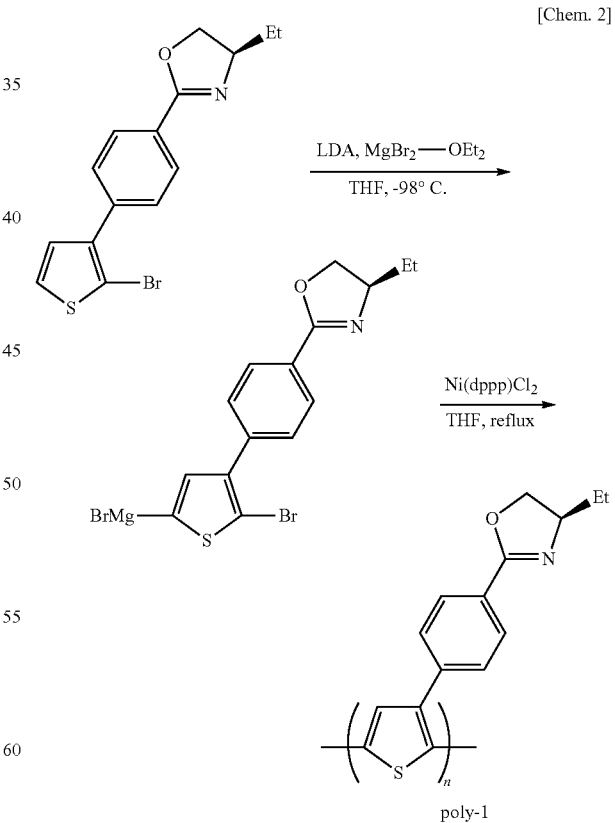

In the processes described in the non patent literature 1 and the patent literature 1, steps of multi-stages are necessary, and each step needs to be carried out after the temperature is controlled to an extremely low-temperature region, and in the case where this process is applied to industrial production, there is a problem that the degree of difficulty of this process becomes extremely high from the viewpoints of process control and cooling ability of mass production facilities.

In patent literatures 2 and 3, a synthesis process for poly(3-substituted thiophene) improved in the above problems is described. In this process, the number of steps is small as shown in the following chemical reaction formula, the reaction time is about 3 hours, and the reaction temperature is not in the above low-temperature region but is under the THF reflux temperature conditions. That is to say, this process is a synthesis process greatly improved from the viewpoint of industrial production.

[Chem. 3]

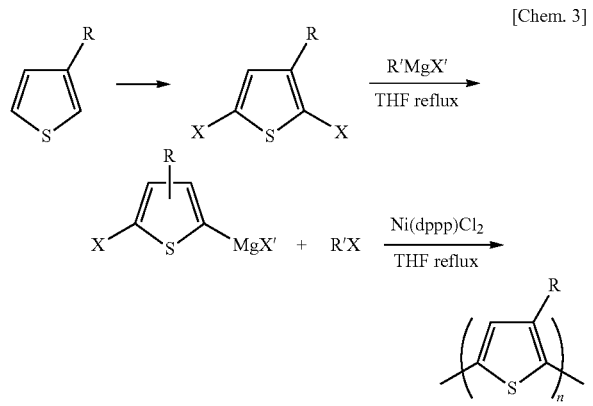

As for the polymer obtained in the above synthesis process, however, there is no clear description of a molecular weight and regioregularity, and there are fears of lowering of a molecular weight due to shortening of the reaction time, lowering of regioregularity due to a raise in the reaction temperature, etc. Further, the yield of the desired polymer in this reaction is about 40 to 65%, and when industrial production is supposed, this yield cannot be said to be good at all. In addition, in the case where 2,5-dibromination from 3-substituted thiophene is carried out and then mono-metallization is carried out to finally synthesize a polymer, the dibrominated monomer whose polymer chain both end groups are not taken into account is said to have a low atom efficiency because the process is accompanied by elimination of a bromo group of 2 atoms. Furthermore, methyl bromide and methyl iodide formed as reaction by-products in this reaction are substances having been reported to be mutagenic. On that account, the cost of treatment of the mutagenic substances is high, and in the environmental aspect, this process cannot be said to be preferred as an industrial production process requiring mass productivity of the process.

In non patent literatures 2 and 3, a synthesis process for poly(3-substituted thiophene), which is represented by the following chemical reaction formula, is described.

[Chem. 4]

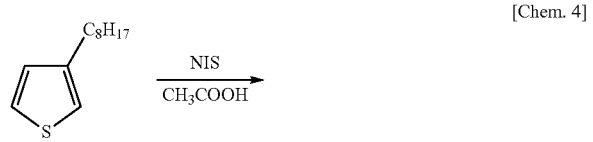

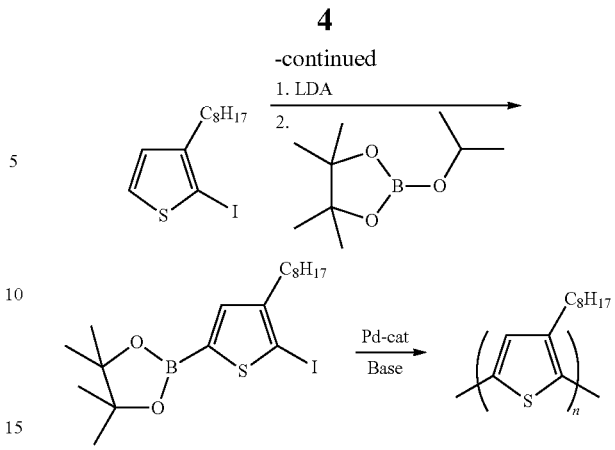

* In the above chemical reaction formula, NIS is N-iodosuccinimide.

In this process, however, synthesis of a monomer used for the polymerization is carried out by multi-stage reaction, as shown in the above formula, and therefore, purification, etc. become necessary in each step (particularly, reaction in the monomer synthesis stage). On that account, when this process is applied to the industrial production of poly(3-substituted thiophene), there is a fear of complicated steps.

In a patent literature 4 and a nonpatent literature 4, a synthesis process for poly(3-substituted thiophene), which is represented by the following chemical reaction formula, is described.

[Chem. 5]

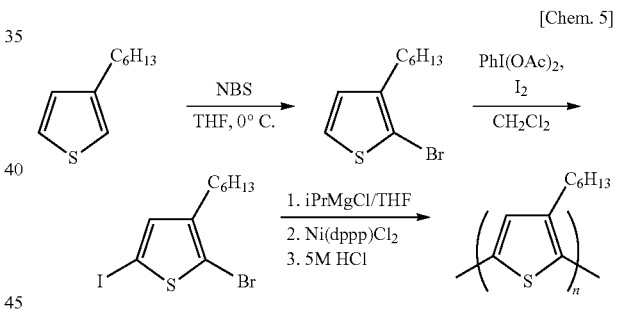

* In the above chemical reaction formula, NBS is N-bromosuccinimide.

In this process, however, the synthesis reaction for a monomer used for the polymerization is a multi-stage reaction, similarly to the process described in the above non patent literatures 2 and 3, and therefore, purification, etc. become necessary in each step (particularly, reaction in the monomer synthesis stage). Hence, when this process is applied to the industrial production, there is a fear of complicated steps.

In a non patent literature 5, a process for obtaining poly(3-hexylthiophene) by polymerizing 2-bromo-3-hexylthiophene in the presence of a palladium catalyst, a specific phosphine compound, cesium carbonate and THF is described.

As shown in the above examples of thiophene, the hitherto known polymerization processes for cyclic conjugated polymers have various problems such that the degree of difficulty of the reaction is high and the treatment of the by-products is complicated.

CITATION LIST

Patent Literature

Patent literature 1: Japanese Patent No. 3830677
Patent literature 2: Japanese Patent No. 4166918
Patent literature 3: Japanese Patent Laid-Open Publication No. 2008-81748
Patent literature 4: Japanese Patent Laid-Open Publication No. 2004-115695

Non Patent Literature

Non patent literature 1: Synthetic metals, 55-57, 1993, 1198-1203
Non patent literature 2: J. Polym. Sci. Part A: Polym. Chem., vol. 43, 1454-1462, 2005
Non patent literature 3: J. Polym. Sci. Part A: Polym. Chem., vol. 46, 4556-4563, 2008
Non patent literature 4: Macromolecules, 2004, 37, 1169-1171
Non patent literature 5: "Synthesis of Polythiophenes based on Direct Arylation Reaction", the Japan Chemical Society 90th Annual Spring Meeting (2010) Preprints 2F1-51

In most of the conventional preparation processes for poly(3-substituted thiophene), substituents such as halogen atoms are introduced into both of the 2-position and the 5-position of thiophene, and the preparation steps are complicated.

It is an object of the present invention to provide a process for preparing a cyclic conjugated polymer, which uses an inexpensive raw material and has easy preparation steps such that there is no need to control the reaction temperature to a low-temperature region and by which a cyclic conjugated polymer having excellent regioregularity and molecular weight distribution that are equal to or higher than those of poly(3-substituted thiophene) prepared by the aforesaid conventional preparation processes for poly(3-substituted thiophene) is prepared in a yield equal to that in the conventional processes.

SUMMARY OF THE INVENTION

The present invention is characterized by providing a preparation process for a cyclic conjugated polymer, comprising:
deprotonating a monohalogenated cyclic conjugated compound of a 5- to 7-membered ring using a deprotonation catalyst comprising secondary amine represented by $R^1$—NH—$R^2$ (1) (in the formula (1), $R^1$ and $R^2$ are the same or different and are each a branched or cyclic alkyl group of 1 to 15 carbon atoms or a phenyl group) and a Grignard reagent represented by $R^3$—MgX (2) (in the formula (2), X is a halogen atom selected from chlorine, bromine and iodine, and $R^3$ is a straight-chain or branched alkyl group of 1 to 6 carbon atoms), and
polymerizing the deprotonated monohalogenated cyclic conjugated compound.

The present invention is characterized by providing a polymerization catalyst for a cyclic conjugated polymer, obtained by combining a deprotonation catalyst comprising secondary amine represented by $R^1$—NH—$R^2$ (1) (in the formula (1), $R^1$ and $R^2$ are the same or different and are each a branched or cyclic alkyl group of 1 to 15 carbon atoms or a phenyl group) and a Grignard reagent represented by $R^3$—MgX (2) (in the formula (2), X is a halogen atom selected from chlorine, bromine and iodine, and $R^3$ is a straight-chain or branched alkyl group of 1 to 6 carbon atoms), with a transition metal compound.

According to the present invention, a monohalogenated cyclic conjugated compound is deprotonated by the use of a deprotonation catalyst comprising secondary amine and a Grignard reagent, and the thus obtained deprotonated monohalogenated cyclic conjugated compound is polymerized in the presence of a specific transition metal catalyst, whereby a cyclic conjugated polymer having properties equal to or higher than those of a cyclic conjugated polymer obtained by a conventional process is easily obtained in a yield nearly equal to that in the conventional process.

In the present invention, the deprotonated monohalogenated cyclic conjugated compound is preferably polymerized in the presence of a transition metal catalyst.

The monohalogenated cyclic conjugated compound is preferably a monohalogenated carbocyclic conjugated compound or a monohalogenated heterocyclic conjugated compound.

It is preferable that the monohalogenated cyclic conjugated compound has a 5- to 7-membered ring-containing heterocyclic structure and further has an electron donating group, such as an alkyl group, an alkoxy group, an alkenyl group or an alkynyl group, or an electron withdrawing group that is a group wherein hydrogen of an alkyl group, an alkoxy group, an alkenyl group or an alkynyl group has been replaced with fluorine.

The monohalogenated cyclic conjugated compound is preferably a monochloro cyclic conjugated compound or a monobromo cyclic conjugated compound.

The monochloro cyclic conjugated compound is preferably thiophene having a halogen atom at the 2-position and having, at the 3-position, an alkyl group of 2 to 20 carbon atoms (a part or all of hydrogen atoms may be replaced with fluorine atoms, the same shall apply hereinafter), an alkoxy group of 2 to 20 carbon atoms (a part or all of hydrogen atoms may be replaced with fluorine atoms, the same shall apply hereinafter), an alkenyl group of 2 to 20 carbon atoms (a part or all of hydrogen atoms may be replaced with fluorine atoms, the same shall apply hereinafter) or an alkynyl group of 2 to 20 carbon atoms (a part or all of hydrogen atoms may be replaced with fluorine atoms, the same shall apply hereinafter).

The monochloro cyclic conjugated compound is preferably furan having a halogen atom at the 2-position and having, at the 3-position, an alkyl group of 2 to 20 carbon atoms, an alkoxy group of 2 to 20 carbon atoms, an alkenyl group of 2 to 20 carbon atoms or an alkynyl group of 2 to 20 carbon atoms.

The monochloro cyclic conjugated compound is preferably pyrrole having a halogen atom at the 2-position and having, at the 3-position, an alkyl group of 2 to 20 carbon atoms, an alkoxy group of 2 to 20 carbon atoms, an alkenyl group of 2 to 20 carbon atoms or an alkynyl group of 2 to 20 carbon atoms.

The monochloro cyclic conjugated compound is preferably benzene having a halogen atom at the 1-position and having, at each of the 2-, 3-, 5- and 6-positions, an alkyl group of 2 to 20 carbon atoms, an alkoxy group of 2 to 20 carbon atoms, an alkenyl group of 2 to 20 carbon atoms, an alkynyl group of 2 to 20 carbon atoms or a fluorine atom.

The monochloro cyclic conjugated compound is preferably pyrimidine having a halogen atom at the 2-position or the 5-position.

The monochloro cyclic conjugated compound is preferably pyridine having a halogen atom at the 3-position and having an alkyl, alkoxy, alkenyl or alkynyl group at the 2-position.

The monochloro cyclic conjugated compound is preferably thiazole having a halogen atom at the 2-position.

The secondary amine represented by the formula (1) is preferably dicyclohexylamine, dimethylamine, diethylamine, dipropylamine, diisopropylamine, dibutylamine, dipentylamine, dihexylamine, diheptylamine, dioctylamine, dinonylamine, didecylamine, diundecylamine, didodecylamine, diphenylamine or 2,2,6,6-tetramethylpiperidine.

The Grignard reagent represented by the formula (2) is preferably a reaction product obtained by allowing a halide, such as methyl chloride, methyl bromide, methyl iodide, ethyl chloride, ethyl bromide, ethyl iodide, isopropyl chloride, isopropyl bromide, isopropyl iodide, butyl chloride, butyl bromide, butyl iodide, cyclohexyl bromide, cyclopentyl bromide, cyclopropylpropyl bromide, 2,5-dimethylphenyl bromide, heptyl bromide, octyl bromide, pentadecyl bromide, phenyl chloride, phenyl bromide, phenyl iodide, ortho-tolyl bromide, meta-tolyl bromide, para-tolyl bromide, vinyl bromide, benzyl chloride, benzyl bromide or benzyl iodide, to react with metallic magnesium in anhydrous ether. If the Grignard reagent is commercially available, it is enough just to purchase and use it. Unless the Grignard reagent is commercially available, it can be easily prepared by the reaction of various halides with metallic magnesium in anhydrous ether.

In the above process, the secondary amine represented by the formula (1) is preferably added in a catalytic amount.

The transition metal catalyst is preferably a nickel catalyst and/or a palladium catalyst.

In the present invention, a monohalogenated cyclic conjugated compound wherein a halogen atom has been monosubstituted is used as a monomer. Therefore, when a dehalogenation catalyst comprising secondary amine and a Grignard reagent is allowed to act thereon, a specific site in the cyclic conjugated compound is dehalogenated, and the halogen atom bond position and the deprotonated position are (head-to-tail) connected, and a polymer having high regioregularity can be obtained.

According to the present invention, an inexpensive raw material is used, the preparation steps are easy, there is no need to control the reaction temperature to a low-temperature region, and a cyclic conjugated polymer having excellent regioregularity and molecular weight distribution that are equal to or higher than those of poly(3-substituted thiophene) prepared by a conventional preparation process for poly(3-substituted thiophene) can be easily prepared in a yield equal to that in the conventional process

DESCRIPTION OF EMBODIMENTS

Figure 1:
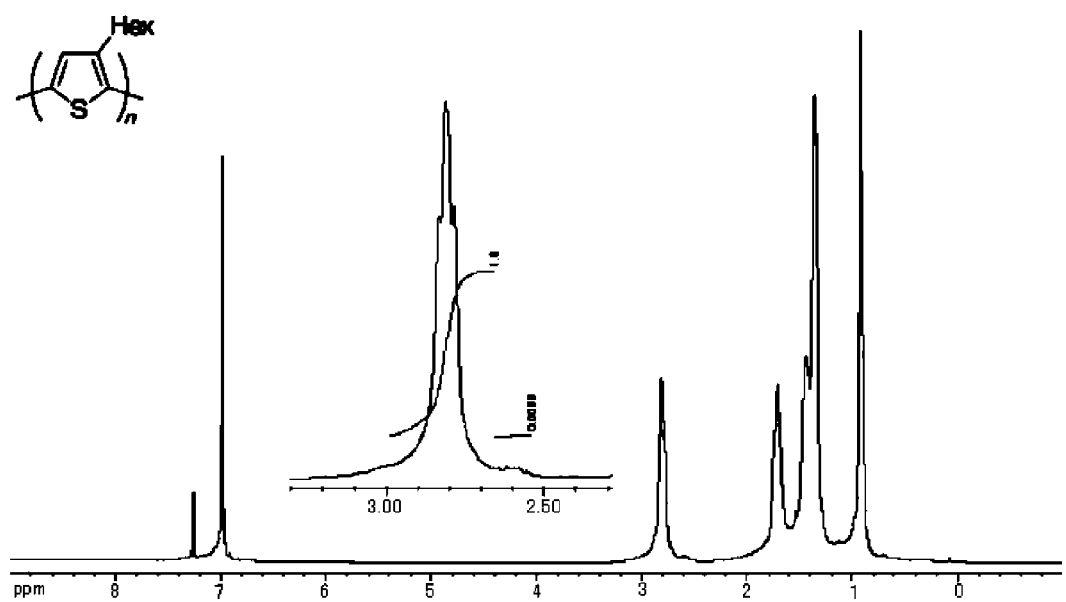
FIG. 1 shows a $^1$H NMR spectrum of Example 1.
Figure 2:
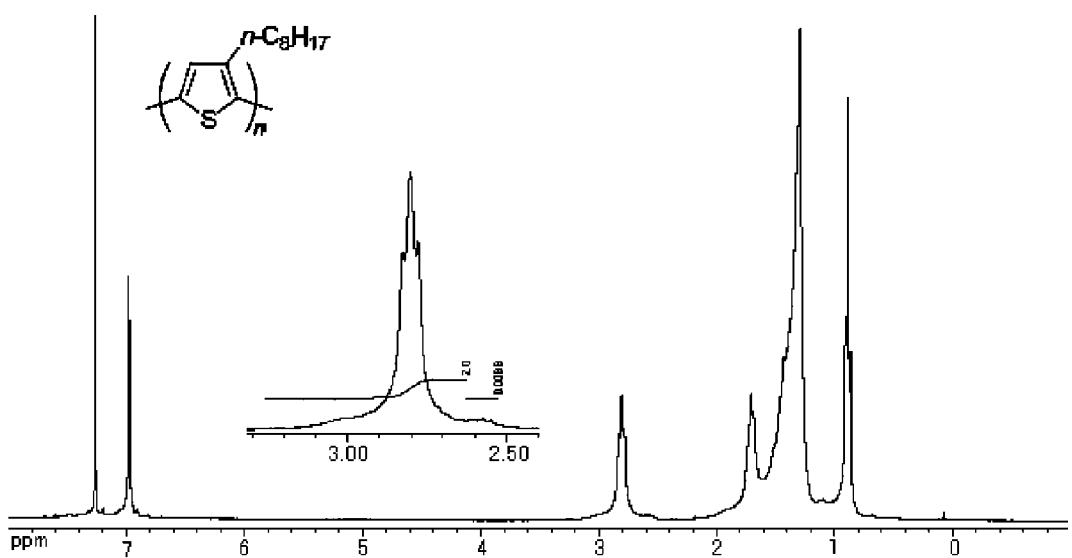
FIG. 2 shows a $^1$H NMR spectrum of Example 2.
Figure 3:
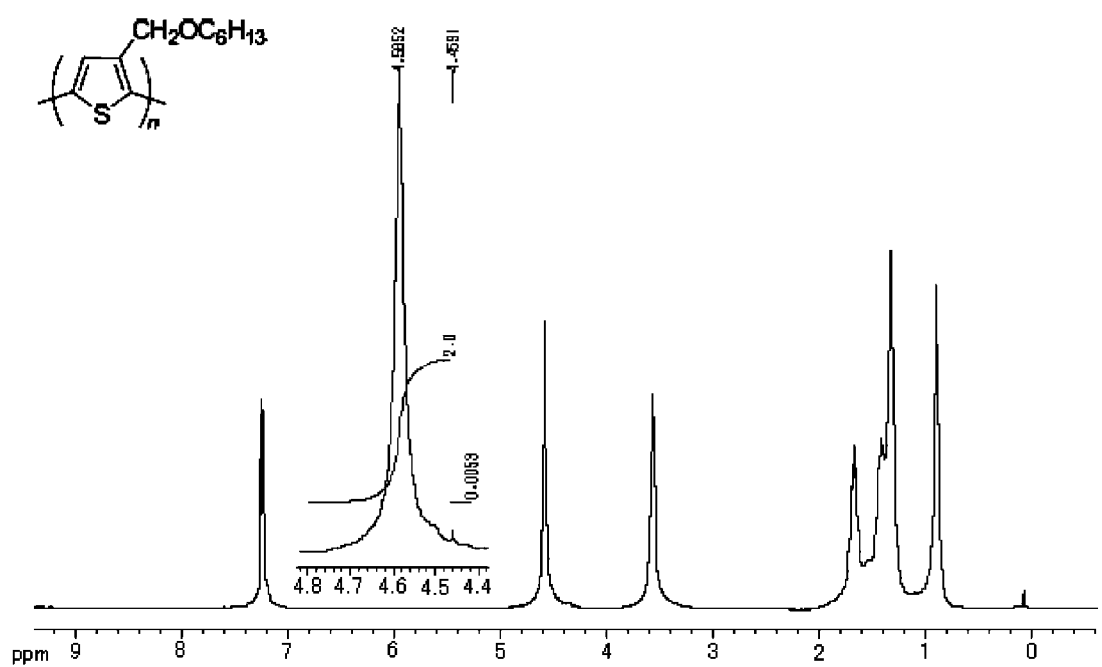
FIG. 3 shows a $^1$H NMR spectrum of Example 3.

The preparation process for a cyclic conjugated polymer of the present invention is described in detail hereinafter.

[Monohalogenated Cyclic Conjugated Compound]

The reaction raw material in the preparation process for a cyclic conjugated polymer of the present invention is a monohalogenated cyclic conjugated compound of a 5- to 7-membered ring. The cyclic part of the monohalogenated cyclic conjugated compound that is particularly preferable as a reaction raw material is a 5- to 7-membered ring, preferably a 5- to 6-membered ring. The cyclic part of the cyclic conjugated compound has only to be formed by conjugated n-electrons, and it may be an aromatic ring or a non-aromatic ring, or may be a carbon ring or a heterocyclic ring. Specific examples of such compounds include pyrrole, thiophene, furan, thiazole, naphthalene, phenanthroline, benzene, pyridine, pyrimidine, thienothiophene, quinoxaline, benzothiadiazole, fluorene, carbazole and azulene. Of these, thiophene, pyridine and pyrimidine are particularly preferable.

The halogen atom bonded to the monohalogenated cyclic conjugated compound may be any of an iodine atom, a bromine atom and a chlorine atom. However, from the viewpoint of ease of occurrence of halogen exchange during the reaction with the later-described Grignard reagent and from the environmental viewpoint for the reason that methyl iodide and methyl bromide, i.e., reaction by-products after the elimination, have been reported to be mutagenic, chlorine and bromine are preferable, and chlorine is particularly preferable.

The monohalogenated cyclic conjugated compound is preferably a compound having been monohalogenated with a halogen atom having electronegativity equal to that of the halogen atom to constitute the Grignard reagent or higher than that of the halogen atom to constitute the Grignard reagent, that is, a halogen atom having elimination ability equal to or lower than that of the halogen atom to constitute the Grignard reagent. For example, when the halogen atom to constitute the Grignard reagent is a bromine atom, the halogen atom bonded to the monohalogenated cyclic conjugated compound is a chlorine atom or a bromine atom, and when the halogen atom to constitute the Grignard reagent is a chlorine atom, the halogen atom bonded to the monohalogenated cyclic conjugated compound is a chlorine atom. The reason is that if the halogen atom bonded to the monohalogenated cyclic conjugated compound has higher elimination ability than the halogen atom to constitute the Grignard reagent, a carbon-to-halogen bond of the monohalogenated cyclic conjugated compound reacts with the Grignard reagent when the dehalogenation catalyst comprising the later-described Grignard reagent and secondary amine is brought into contact with the compound, and as a result, halogen exchange takes place preferentially to deprotonation. The electronegativity is referred to a tendency of an atom itself to attract an electron when the atom constitutes a compound, and in general, a smaller atom tends to attract an electron than a larger atom and is more electronegative. Of the halogen atoms, therefore, a fluorine atom has the largest electronegativity, and as the halogen atom comes close to iodine on the lower side of the periodic table, the electronegativity becomes smaller.

The monohalogenated cyclic conjugated compound may have an arbitrary substituent (solvent-solubilizing group) other than the reactive functional group for forming a main chain skeleton of the polymer. Examples of the arbitrary substituents include straight-chain or branched alkyl groups of 2 to 20 carbon atoms, straight-chain or branched alkoxy groups of 2 to 20 carbon atoms, alkenyl groups of 2 to 20 carbon atoms and cycloalkyl groups of 3 to 120 carbon atoms. Of these, preferable are straight-chain or branched alkyl groups of 4 to 15 carbon atoms, straight-chain or branched alkoxy groups of 4 to 15 carbon atoms or alkenyl groups of 4 to 15 carbon atoms, and more preferable are straight-chain or branched alkyl groups of 4 to 15 carbon atoms. The monohalogenated cyclic conjugated compound may be a monochloro carbocyclic compound or a monochloro heterocyclic compound. The cyclic compound may be a compound of an aromatic ring or a non-aromatic ring.

In the preparation process of the present invention, deprotonation occurs at the specific position of the monohalogenated cyclic conjugated compound that is a monomer, and when the monomer molecules are bonded to each other in the presence of a transition metal catalyst, the halogen atom bond position and the deprotonated position are (head-to-tail) connected. Therefore, even if a monohalogenated cyclic conjugated compound having such a substituent is polymerized, a polymer having high regioregularity can be obtained.

The 3-substituted thiophene that becomes a synthesis raw material of the aforesaid poly(3-substituted thiophene) has an asymmetrical structure, and therefore, when the monomer is polymerized, there is a possibility of occurrence of 3 kinds of connections, that is, 2,2' (head-to-head), 5,5' (tail-to-tail) and 2,5' (head-to-tail) connections. A polymer having many 2,5' (head-to-tail) connections among them has high regioregularity, undergoes self-assembly and thereby can take a densely packed flat polymer structure, so that such a polymer is thought to be preferable for use in the aforesaid electric parts. On the other hand, according to the preparation process of the present invention, a polymer having (head-to-tail) connection can be highly selectively prepared, as previously described.

In the preparation process of the present invention, a preferred monohalogenated cyclic conjugated compound is monochlorothiophene or monobromothiophene and is a compound having an alkyl group of 2 to 20 carbon atoms at the 3-position. Particularly, 2-chloro-3-hexylthiophene, 2-bromo-3-hexylthiophene or the like is preferable.

As the monochloro cyclic conjugated compound, a furan compound having a halogen atom at the 2-position and having, at the 3-position, an alkyl group of 2 to 20 carbon atoms, an alkoxy group of 2 to 20 carbon atoms, an alkenyl group of 2 to 20 carbon atoms or an alkynyl group of 2 to 20 carbon atoms is also preferably used from the viewpoint that a regioregular polymer is obtained because a specific position can be deprotonated.

As the monochloro cyclic conjugated compound, further, a pyrrole compound having a halogen atom at the 2-position and having, at the 3-position, an alkyl group of 2 to 20 carbon atoms, an alkoxy group of 2 to 20 carbon atoms, an alkenyl group of 2 to 20 carbon atoms or an alkynyl group of 2 to 20 carbon atoms is also preferably used from the viewpoint that a regioregular polymer is obtained because a specific position can be deprotonated.

As the monochloro cyclic conjugated compound, furthermore, a benzene compound having a halogen atom at the 1-position and having, at each of the 2-, 3-, 5- and 6-positions, an alkyl group of 2 to 20 carbon atoms, an alkoxy group of 2 to 20 carbon atoms, an alkenyl group of 2 to 20 carbon atoms, an alkynyl group of 2 to 20 carbon atoms or a fluorine group is also preferably used from the viewpoint that a regioregular polymer is obtained because a specific position can be deprotonated.

As the monochloro cyclic conjugated compound, a pyrimidine compound having a halogen atom at the 2-position or the 5-position is also preferably used from the viewpoint that a regioregular polymer is obtained because a specific position can be deprotonated.

The monochloro cyclic conjugated compound is preferably pyridine having a halogen atom at the 3-position and having an alkyl group, an alkoxy group, an alkenyl group or an alkynyl group at the 2-position.

As the monochloro cyclic conjugated compound, a thiazole compound having a halogen atom at the 2-position is also preferably used from the viewpoint that a regioregular polymer is obtained because a specific position can be deprotonated.

[Deprotonation Catalyst]

The deprotonation catalyst for use in the preparation process of the present invention comprises secondary amine represented by the formula (1): $R^1$—NH—$R^2$ and a Grignard reagent represented by the formula (2): $R^3$—MgX. The secondary amine and the Grignard reagent are described below.

<Secondary Amine>

The secondary amine represented by the formula (1): $R^1$—NH—$R^2$ is used as a deprotonation base. In the formula (1), $R^1$ and $R^2$ are the same or different and are each a branched or cyclic alkyl group of 1 to 15 carbon atoms or a phenyl group. It is preferable that $R^1$ and $R^2$ are the same or different and are each a branched or cyclic alkyl group of 3 to 10 carbon atoms among them, and it is more preferable that they are each a cyclic alkyl group of 6 to 10 carbon atoms that becomes sterically bulky. Specifically, dicyclohexylamine or 2,2,6,6-tetramethylpiperidine can be mentioned.

<Grignard Reagent>

As the Grignard reagent represented by the formula (2): $R^3$—MgX, there can be mentioned a reagent wherein $R^3$ is a straight-chain or branched alkyl group of 1 to 6 carbon atoms, or a phenyl group, and X is chorine, bromine or iodine. Of such reagents, a reagent wherein $R^3$ is an ethyl group, a butyl group or an isopropyl group, and X is chlorine or bromine is more preferable because it is easily commercially available. Particularly in the present invention, preferable is a halogen atom having electronegativity that is equal to or lower than that of a halogen atom bonded to the substituted halogenated thiophene or the like that becomes a reaction raw material.

[Reaction]

<Formation of Active Monomer>

The monohalogenated cyclic conjugated compound is allowed to react with the deprotonation catalyst comprising secondary amine and Grignard reagent. When the deprotonation catalyst is added to, for example, 2-halogenated 3-substituted thiophene, a proton at the 5-position of the thiophene is abstracted because of the relationship between the steric hindrance and the electron withdrawing property of a sulfur atom to constitute the thiophene, whereby an active monomer is formed. Subsequently, polymerization is carried out using a transition metal catalyst such as a nickel catalyst, whereby poly(3-substitued)thiophene is obtained. The mechanism of deprotonation of the 2-halogenated 3-substituted thiophene is shown below.

[Chem. 6]

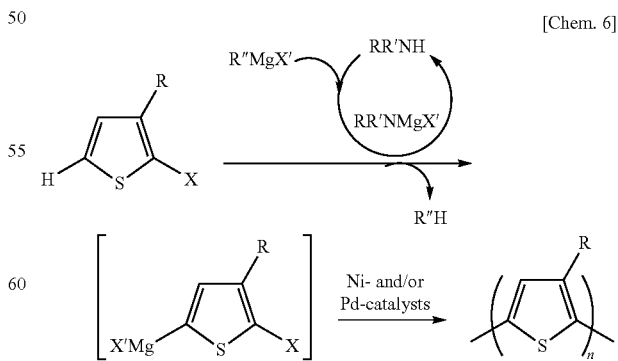

Here, R and R' are the same or different and are each a branched or cyclic alkyl group of 1 to 15 carbon atoms or a phenyl group. R" is a straight-chain or branched alkyl group of 1 to 15 carbon atoms or a phenyl group. X and X' are each independently a chlorine atom, a bromine atom or an iodine atom, and regarding the electronegativity of X and X', X'≥X is satisfied. n is 10 to 10,000.

In the preparation process of the present invention, a monohalogenated form is used, and therefore, environmental burden is smaller as compared with a conventional process using a dihalogenated form, and in the polymerization of a monomer, weight loss is smaller than that in the case of using a dihalogenated form. Therefore, the preparation process of the present invention can be said to have high atom economy.

This reaction can be carried out at normal pressure. The reaction temperature is usually 5 to 100° C., preferably 10 to 60° C., and there is no need to control the temperature to a low-temperature region, differently from the process described in the non patent literature 1. Moreover, since the temperature is not so high, control of the reaction temperature is easy, and the reaction can be promoted mildly. The reaction time is usually 0.5 to 24 hours, preferably 3 to 10 hours.

The reaction is usually carried out in a reaction solvent, and examples of the reaction solvents employable include alcohol-based solvents, such as ethylene glycol, ether-based solvents, such as cyclopentyl methyl ether and tetrahydrofuran (THF), halogenated hydrocarbon-based solvents, such as chlorobenzene and dichlorobenzene, aromatic solvents, such as benzene and xylene, nitrile-based solvents, such as benzonitrile, and sulfoxide-based solvents, such as N,N'-dimethyl sulfoxide and N,N'-dibutyl sulfoxide. Of these, THF is preferable from the viewpoints of commercial availability and low environmental burden from an emission matter (waste liquid) in the industrial-scale production.

The reaction solvent is used in such an amount that the concentration of the monohalogenated cyclic conjugated compound in the reaction solvent preferably becomes $10^{-3}$ M to 1 M, more preferably $10^{-2}$ M to 0.5M, from the viewpoint that inhibition of marked lowering of the stirring efficiency of the polymerization solution accompanying the progress of the below-described polymerization reaction is compatible with prevention of marked impairment of the frequency of collisions between the reactants required for the progress of the polymerization, that is, the monohalogenated cyclic conjugated compound, the active monomer formed from the compound and the catalyst. The reaction solvent can be used successively as a polymerization solvent. When a solvent is contained, the reaction solvent is used in such an amount that the concentration of the monohalogenated cyclic conjugated compound in the total of the solvent and the reaction solvent is in the aforesaid range.

[Polymerization Reaction]

Next, to the reaction system in which the monohalogenated cyclic conjugated compound has been dehalogenated and the active monomer has been formed, a transition metal catalyst in the preparation process for a cyclic conjugated polymer of the present invention is added, and if necessary, a compound that becomes a ligand providing a catalyst of high activity is also added together with the transition metal catalyst, whereby C—C coupling (polymerization) reaction of the active monomer is accelerated to thereby form a polymer. The transition metal catalyst is added after the dehalogenation catalyst is allowed to act on the monohalogenated cyclic conjugated compound to dehalogenate the compound, but the transition metal catalyst may be added to the reaction system together with the dehalogenation catalyst.

The transition metal catalyst is preferably a nickel catalyst and/or a palladium catalyst.

Next, these catalysts are described.

<Nickel Catalyst>

In the present invention, the monohalogenated cyclic conjugated compound having been deprotonated as above is polymerized in the presence of a transition metal catalyst that is a nickel catalyst and/or a palladium catalyst.

It is thought that the nickel catalyst related to the present invention accelerates C—C coupling between the carbon site to which the halogen atom is bonded and the deprotonated carbon site in the active monomer formed by the actions of the monohalogenated cyclic conjugated compound and the deprotonation catalyst. By virtue of such reaction mechanism, C—C coupling is carried out, and therefore, by polymerizing, for example, 2-halogenated 3-substituted thiophene using the nickel catalyst, 2,5' (head-to-tail) connected poly(3-substituted thiophene) having extremely high regioregularity can be obtained.

The nickel catalyst is not specifically restricted provided that it is a catalyst having such catalytic activity, but the nickel catalyst is preferably a nickel complex having, as a ligand, a bidentate neutral phosphine ligand, such as 1,2-bis(diphenylphosphino)ethane, 1,3-diphenylphosphinopropane, 1,4-bis(diphenylphosphino)butane or 1,1'-bis(diphenylphosphino)ferrocene, a monodentate neutral phosphine ligand, such as tri-n-butylphosphine, tri-t-butylphosphine or triphenylphosphine, a neutral n-ligand, such as benzene, cyclobutadiene or cyclooctadiene, a neutral amine ligand, such as ammonia, pyridine or 3-chloropyridine, a monovalent anionic ligand, such as hexamethylcyclopentadienyl, pentamethylcyclopentadienyl, cyclopentadieny, fluorine atom, chlorine atom, bromine atom, iodine atom, carboxylato (acetic acid, propionic acid or the like), acetylacetonato, trifluoromethane sulfonate or 1,3-bis(2,6-diisopropylphenyl)-4,5-dihydroimidazol-2-ylidene, or a divalent anionic ligand, such as phthalocyanine, naphthalocyanine or porphyrin, and having constitution wherein the ligand is coordinated so that the valence of the nickel atom may become a valence of 0 or 2. Specific examples of such nickel catalysts are given below.

[Chem. 7]

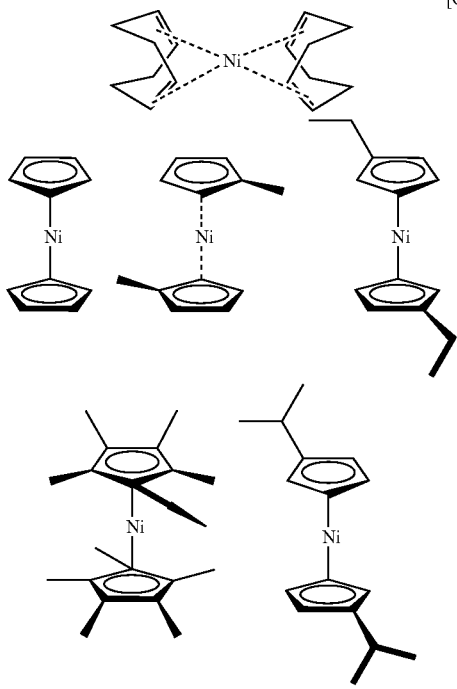

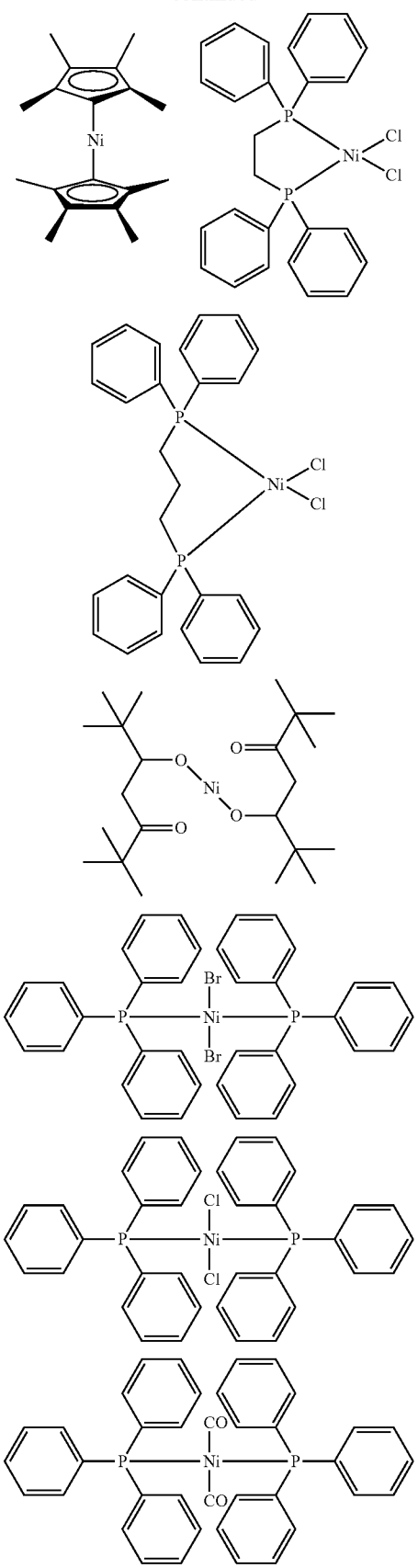
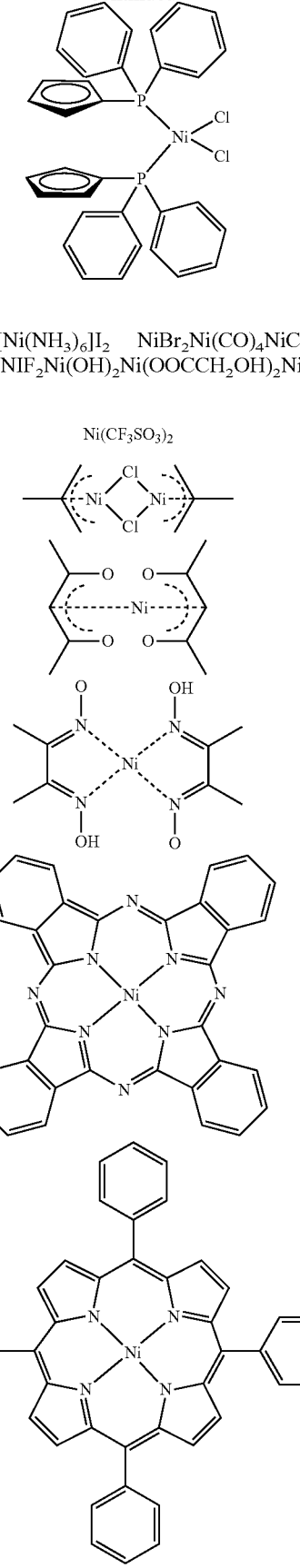
[Ni(NH$_3$)$_6$]Cl$_2$ [Ni(NH$_3$)$_6$]I$_2$  NiBr$_2$ Ni(CO)$_4$ NiCl$_2$ Ni[OOC(CH$_2$)$_3$C$_6$H$_{11}$]$_2$ NIF$_2$ Ni(OH)$_2$ Ni(OOCCH$_2$OH)$_2$ NiI$_2$
Ni(CF$_3$SO$_3$)$_2$

[Chem. 8]
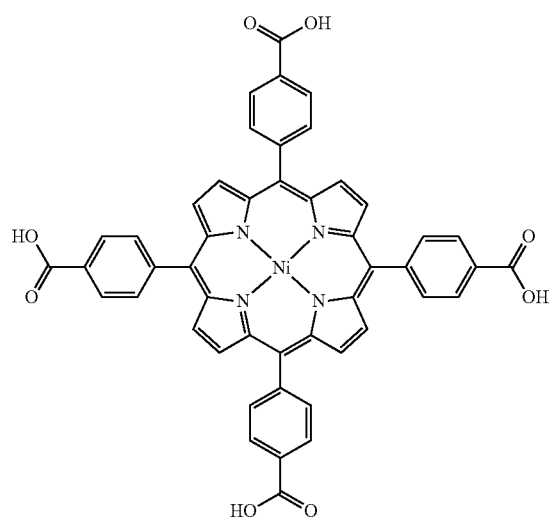
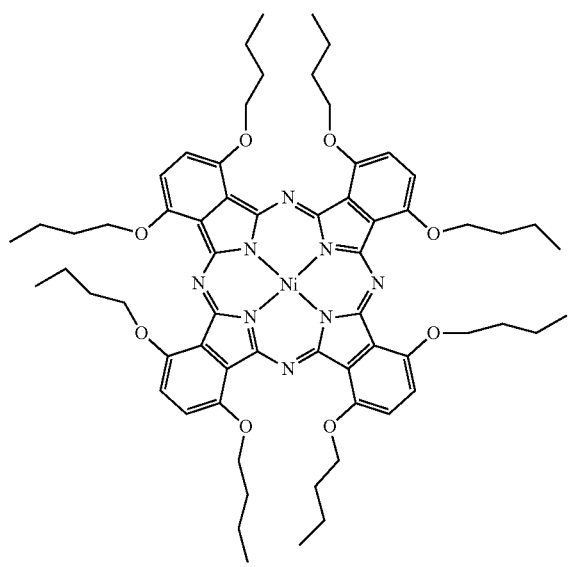
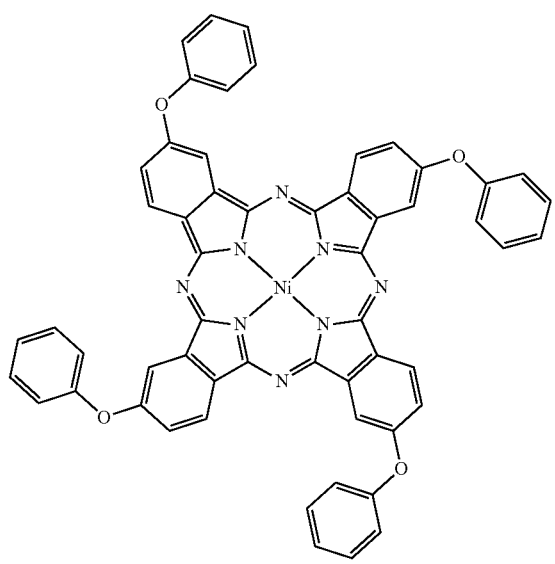
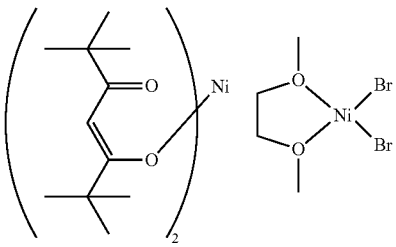
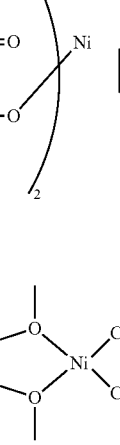
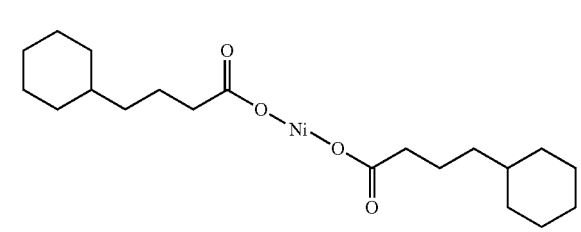
[Chem. 9]
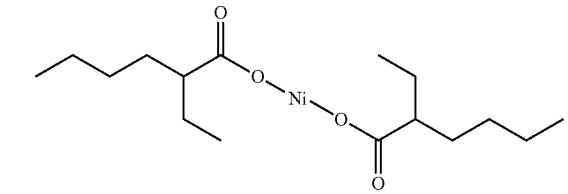
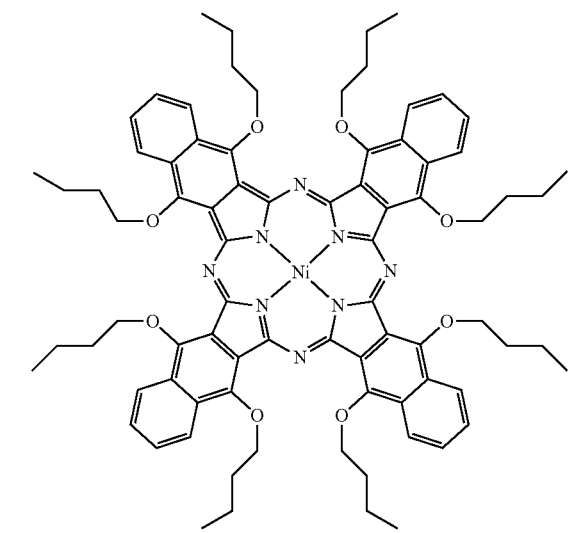

17
-continued

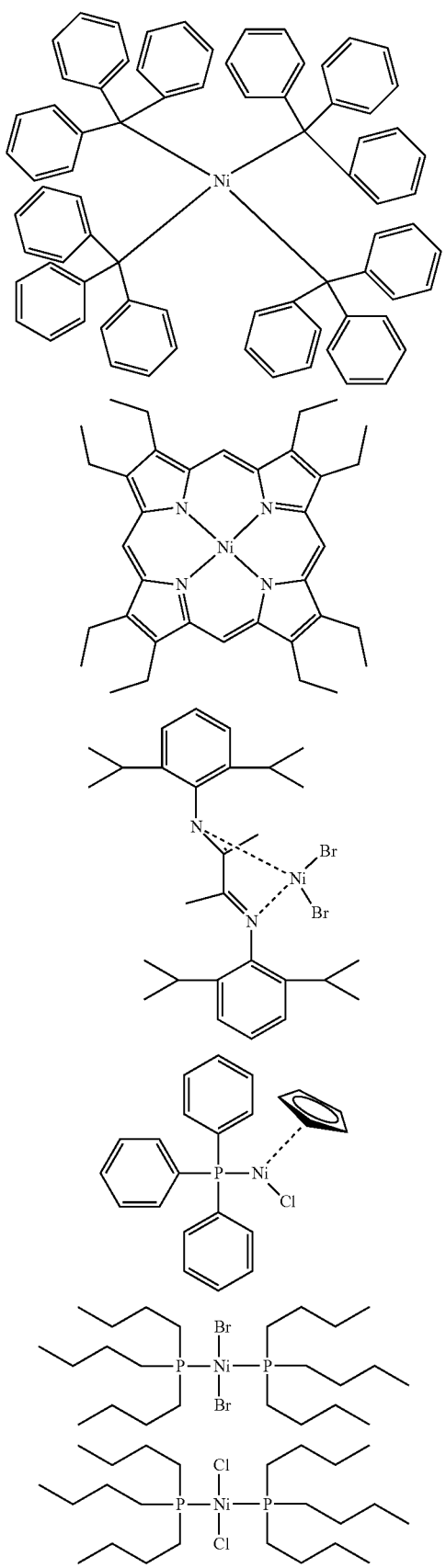

18
-continued

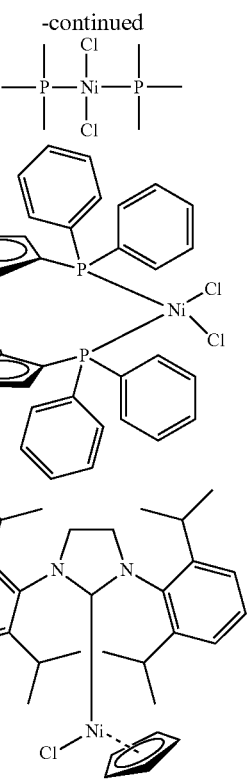

From the viewpoint of obtaining a cyclic conjugated polymer of high regioregularity in a high yield, the nickel catalyst is more preferably NiCl$_2$dppp (1,3-bis(diphenylphosphinopropane)nickel(II) chloride), NiCl$_2$(PPh$_3$)$_2$ (bistriphenylphosphine nickel(II) chloride), NiCl$_2$dppf (substance wherein dppf (see the following formula) has been coordinated to nickel(II) chloride), NiClCpSIPr (see the following formula) or NiCl$_2$(PPh$_3$)iPr ([1,3-bis(2,6-diisopropylphenyl)imidazol-2-ylidene]triphenylphosphine nickel(II) dichloride).

[Chem. 10]

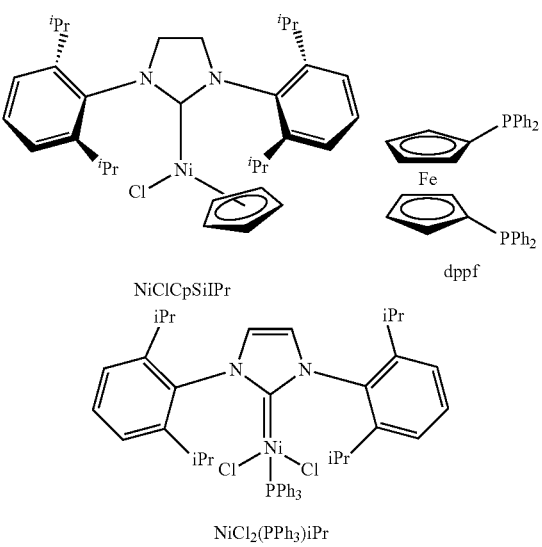

In the polymerization catalyst for a cyclic conjugated polymer of the present invention, the nickel catalysts described above may be contained singly or in combination of two or more kinds.

In the polymerization catalyst for a cyclic conjugated polymer of the present invention, the nickel catalyst is contained usually in an amount of 0.01 to 10% by mol, preferably 0.1 to 5% by mol, based on the monohalogenated cyclic conjugated compound (100% by mol). When the amount of the nickel catalyst is in the above range, a cyclic conjugated polymer of high regioregularity can be obtained in a high yield using the polymerization catalyst for a cyclic conjugated polymer.

The nickel catalyst described above can be easily synthesized by a publicly known process, and is also on the market inexpensively.

The transition metal catalyst related to the present invention may contain a compound that becomes a ligand providing a nickel catalyst of high activity, such as a phosphine ligand, together with the nickel catalyst, and by bringing about ligand exchange reaction between the nickel catalyst and the ligand compound in the system of the polymerization reaction of the monohalogenated cyclic conjugated compound, a nickel catalyst of higher activity may be formed.

As such a ligand compound that brings about ligand exchange reaction to form a nickel catalyst of high activity, there can be mentioned a bidentate neutral phosphine ligand compound or a monodentate neutral phosphine ligand compound, which becomes the ligand previously described regarding the nickel catalyst. Specific examples thereof include the following compounds.

[Chem. 11]

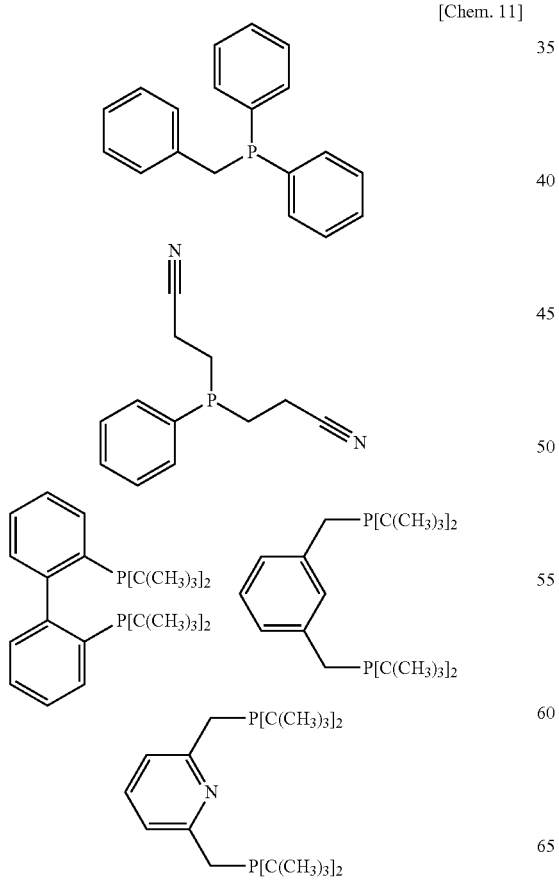

-continued

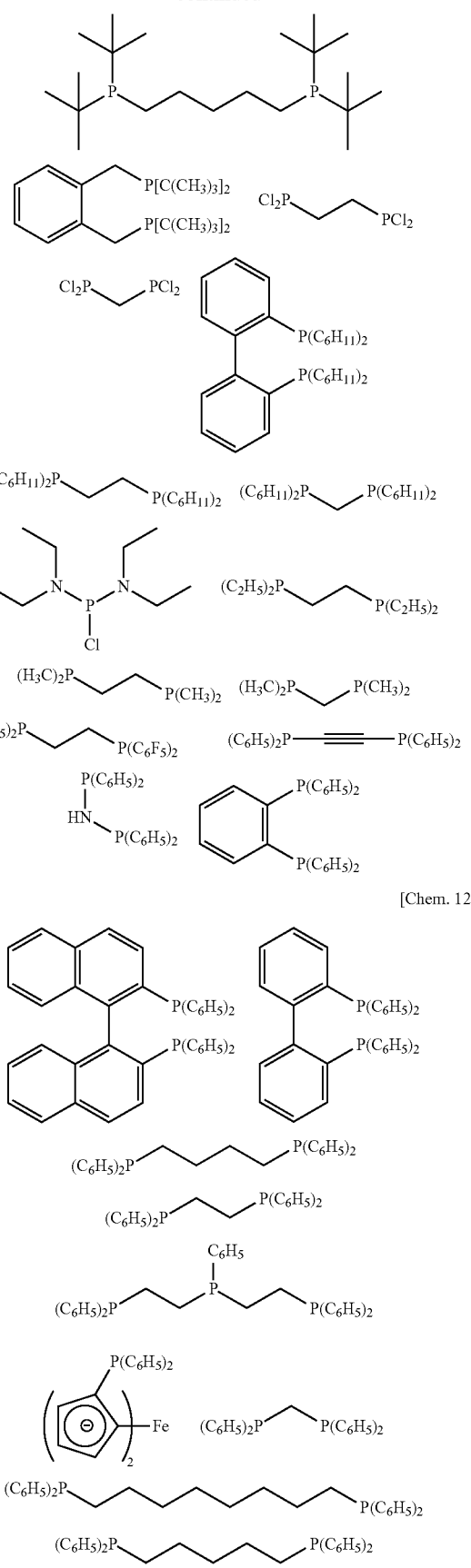

[Chem. 12]

-continued
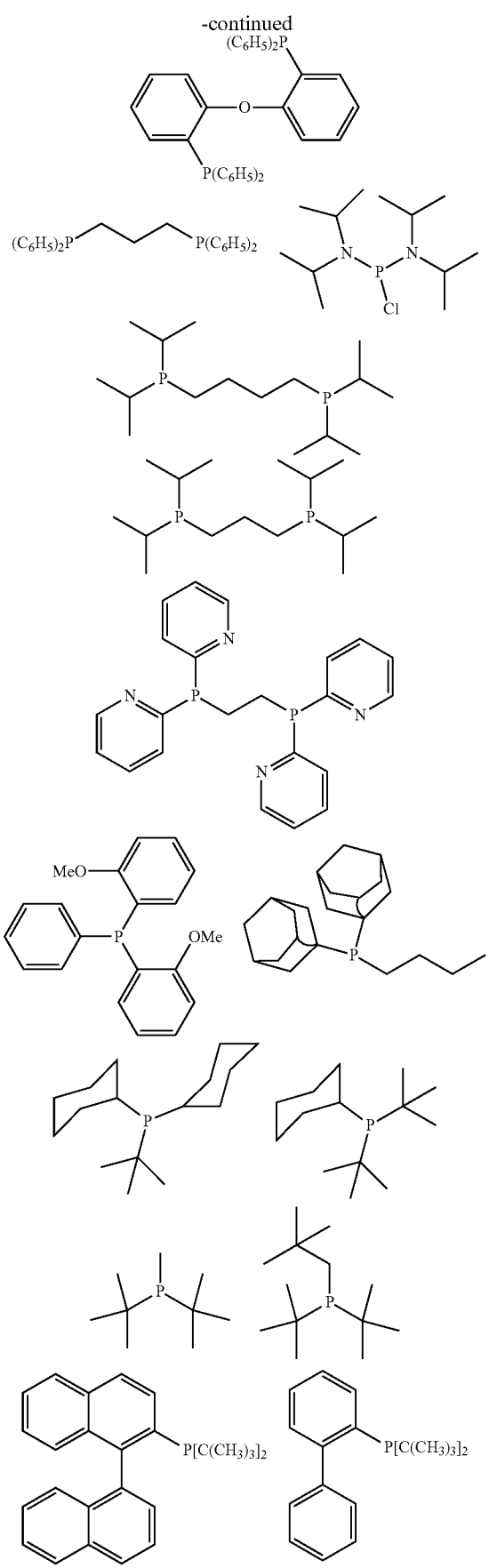
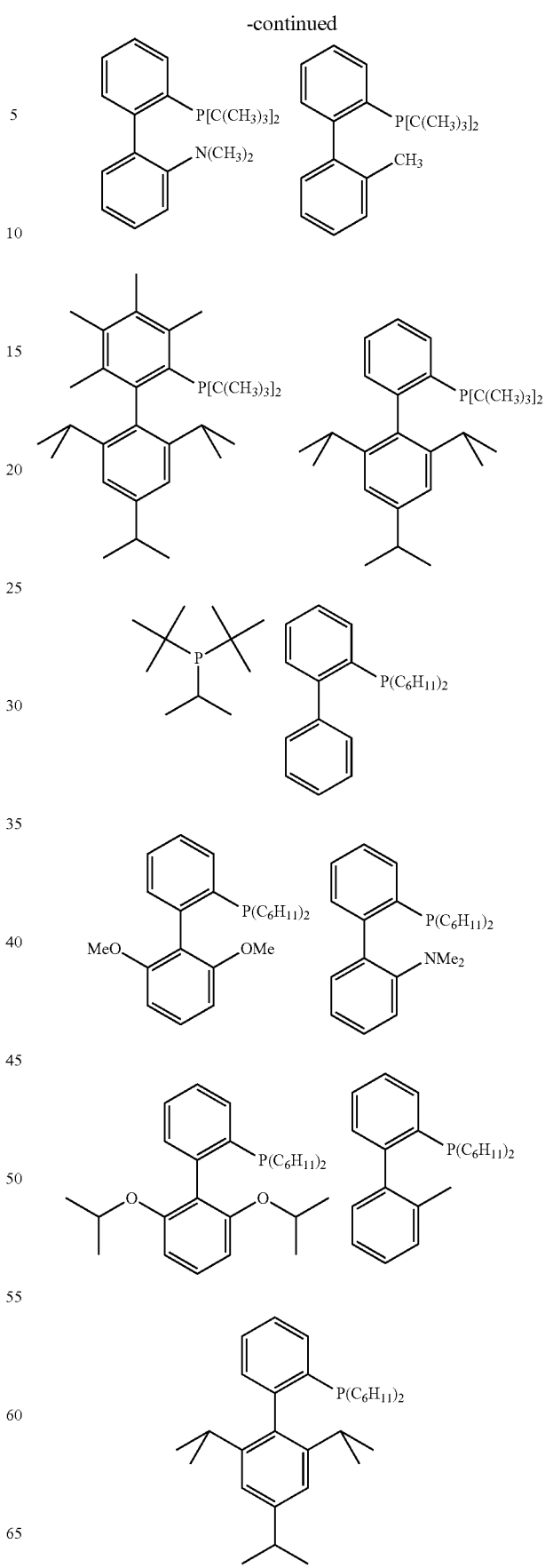

23
-continued
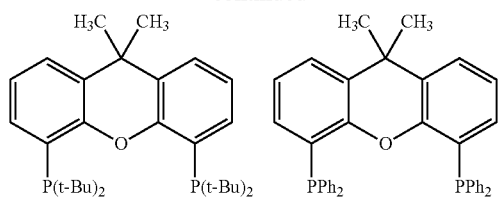
[Chem. 13]
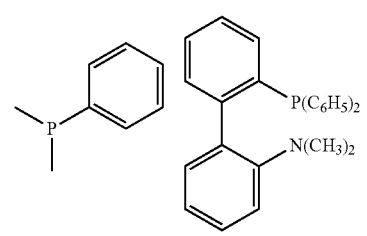
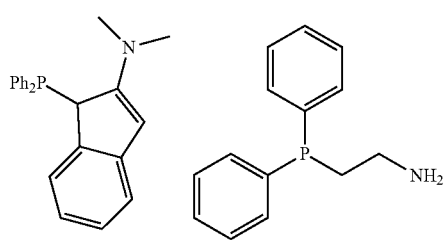
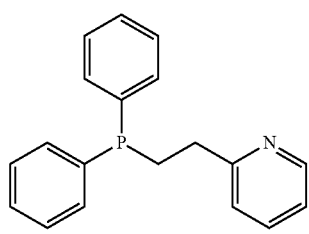
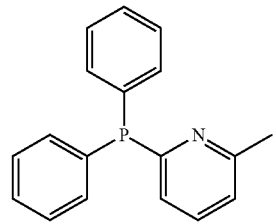
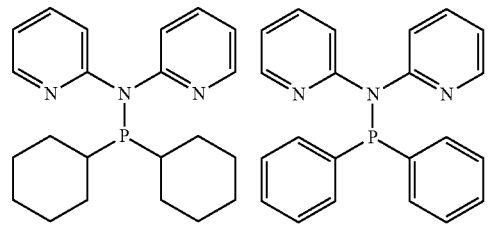
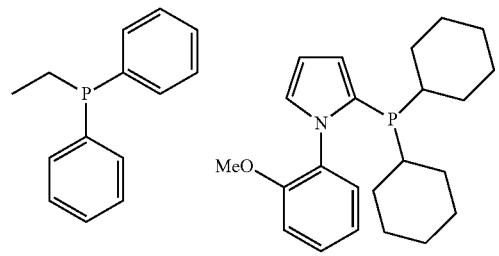
24
-continued
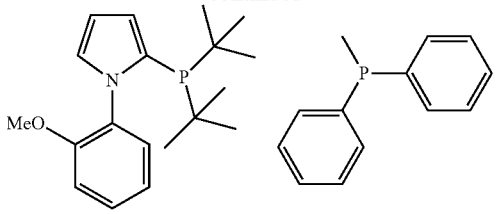
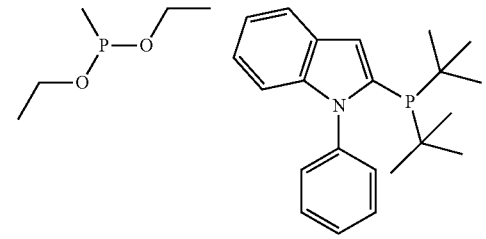
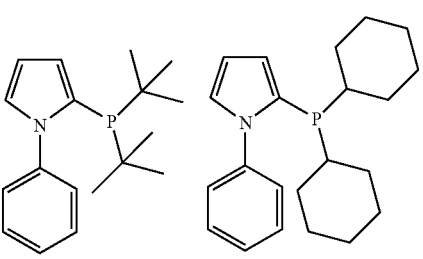
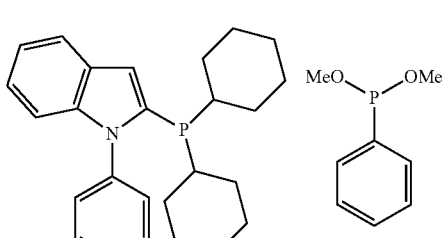
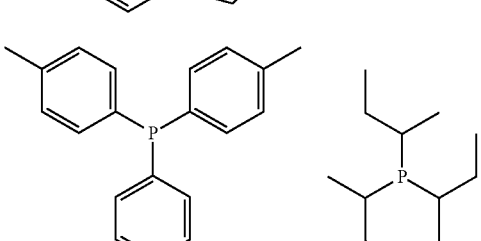
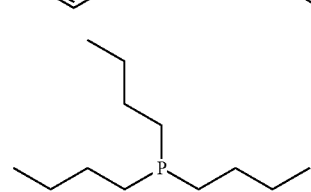
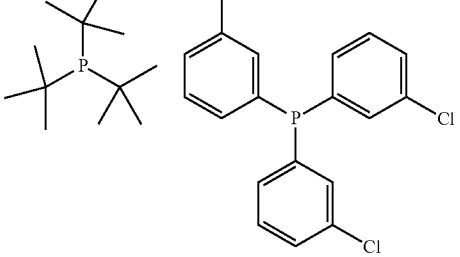

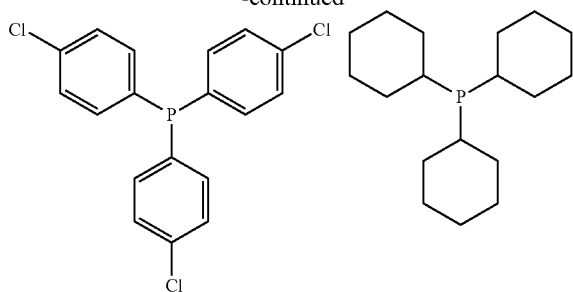
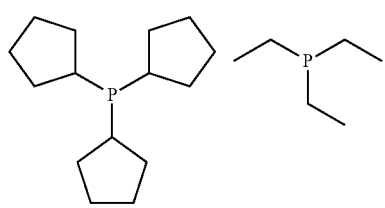
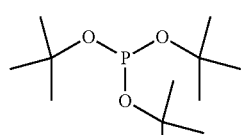
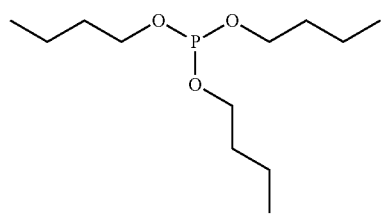
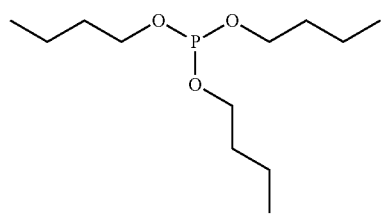
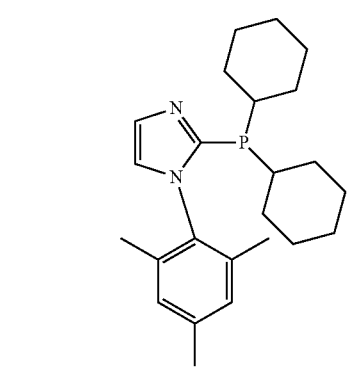
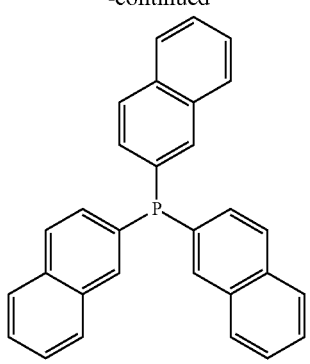
[Chem. 14]
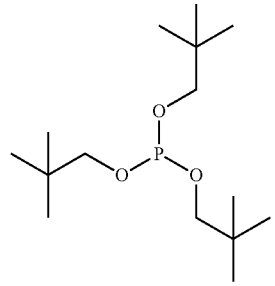
(C$_8$H$_{17}$)$_3$P
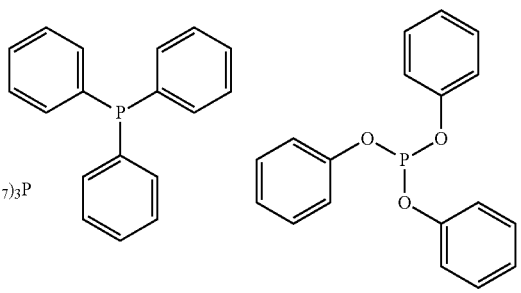
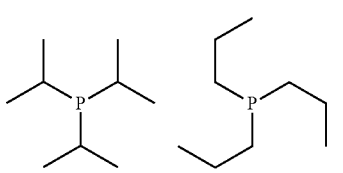
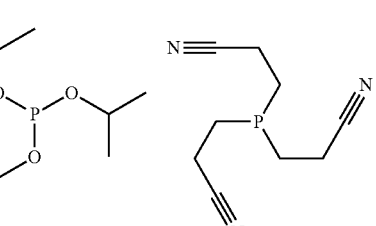
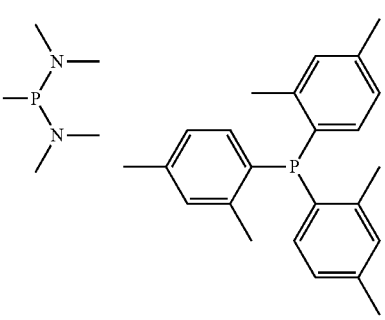

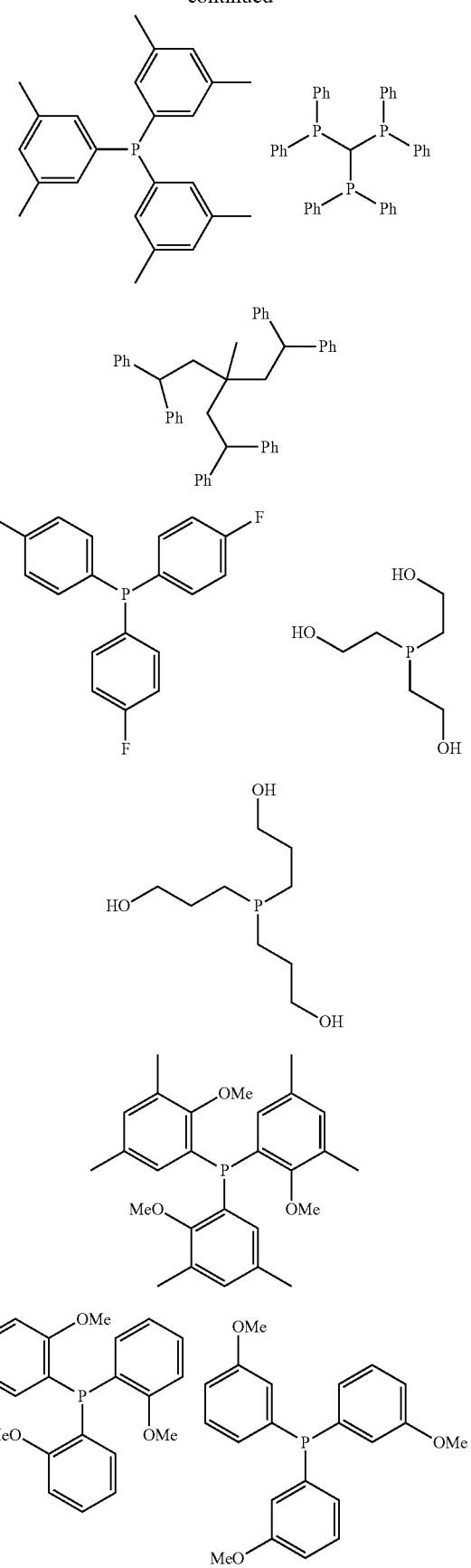
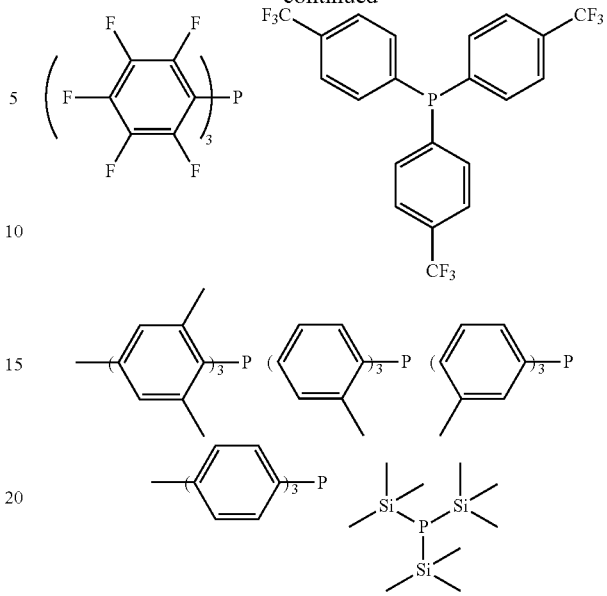

The above-described ligand compounds providing a nickel catalyst of high activity may be used singly, or may be used in combination of two or more kinds. The ligand compounds can be synthesized by publicly known processes, and are also on the market inexpensively.

The ligand compound described above is contained usually in an amount of 5 to 200% by mol, preferably 50 to 150% by mol, based on the nickel catalyst (100% by mol).

Next, the palladium catalyst is described.

<Palladium Catalyst>

Instead of the nickel catalyst or together with the nickel catalyst, a palladium catalyst can be used. It is thought that the palladium catalyst accelerates C—C coupling between the carbon site to which the halogen atom is bonded and the deprotonated carbon site in the active monomer formed by the reaction of the monohalogenated cyclic conjugated compound with the deprotonation catalyst. By virtue of such reaction mechanism, C—C coupling is carried out, and therefore, by polymerizing, for example, 2-halogenated 3-substituted thiophene using the palladium catalyst, a 2,5' (head-to-tail) connected cyclic conjugated polymer having extremely high regioregularity can be obtained.

The palladium catalyst is not specifically restricted provided that it is a catalyst having such catalytic cycle ability, but the palladium catalyst is preferably a palladium complex having, as a ligand, a bidentate neutral phosphine ligand, such as 1,2-bis(diphenylphosphino)ethane, 1,3-bis(diphenylphosphino)propane, 1,4-bis(diphenylphosphino)butane or 1,1'-bis(diphenylphosphino)ferrocene, a monodentate neutral phosphine ligand, such as tri-n-butylphosphine, tri-t-butylphosphine or triphenylphosphine, a neutral π-ligand, such as benzene, cyclobutadiene or cyclooctadiene, a monovalent anionic ligand, such as methyl, phenyl, hexamethylcyclopentadienyl, pentamethylcyclopentadienyl, allyl, cyclopentadienyl, alkoxy (methoxy, phenoxy or the like), fluorine atom, chlorine atom, bromine atom, iodine atom, carboxylato (acetic acid, propionic acid or the like), acetylacetonato, trifluoromethane sulfonate, 1,3-bis(2,6-diisopropylphenyl)-4,5-dihydroimidazol-2-ylidene, 1,3-bis(2,6-diisopropylphenyl) imidazol-2-ylidene or 1,3-bis(2,4,6-trimethylphenyl) imidazol-2-ylidene, a divalent anionic ligand, such as phthalocyanine, naphthalocyanine or porphyrin, a monodentate neutral amine ligand, such as ammonia, pyridine or 3-chloropyridine, a bidentate neutral amine ligand, such as N,N,N',N'-tetramethylethylenediamine, 1,10-phenanthroline or 2,2'-bipyridyl, a neutral nitrile ligand, such as acetonitrile or benzonitrile, or a neutral sulfinyl ligand, such as 1,2-bis (phenylsulfinyl)ethane, and having constitution wherein the ligand is coordinated so that the valence of the palladium atom may become a valence of 0 or 2. Specific examples of such palladium catalysts are given below.

[Chem. 15]

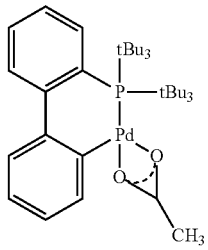

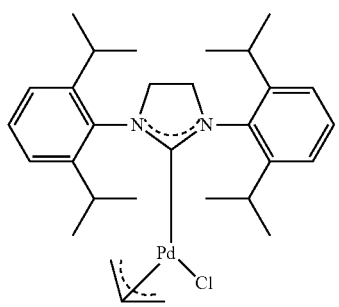

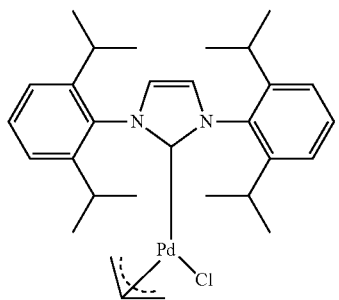

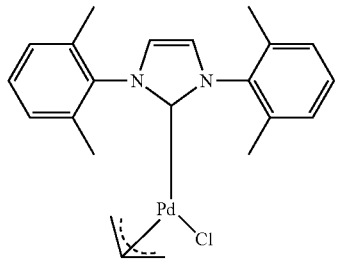

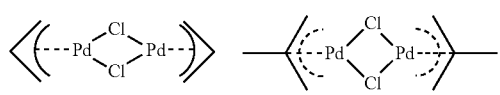

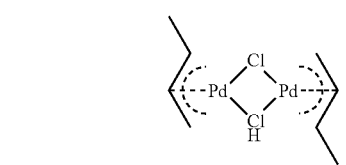

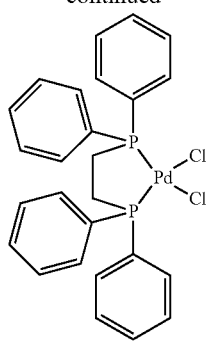

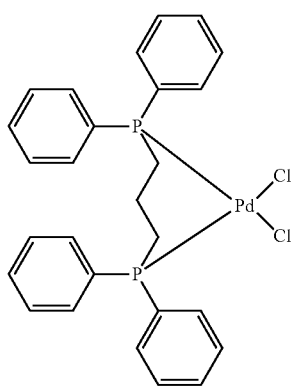

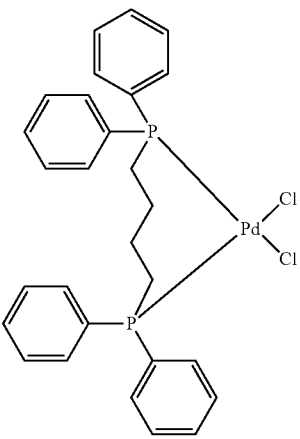

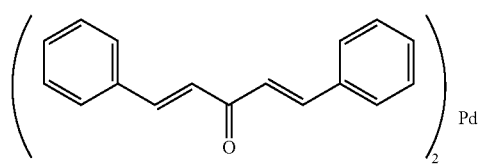

[Chem. 16]

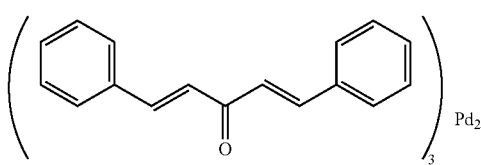

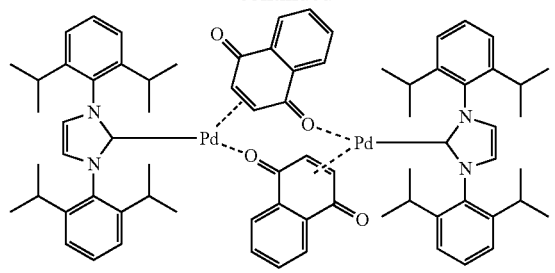
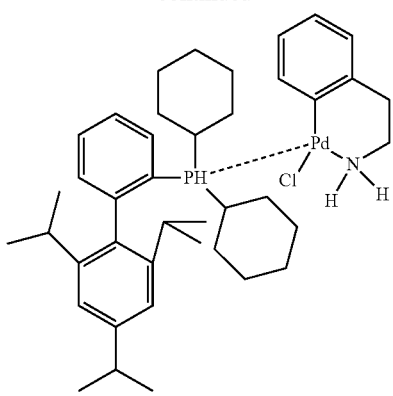
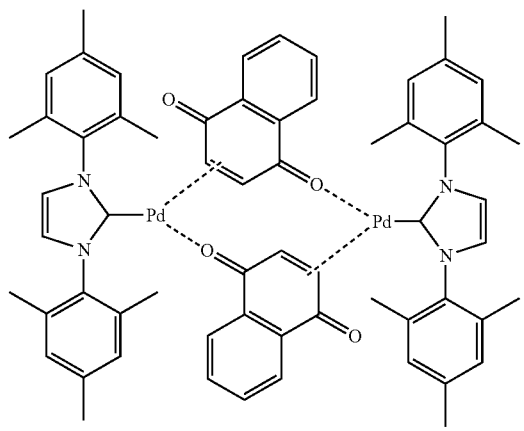
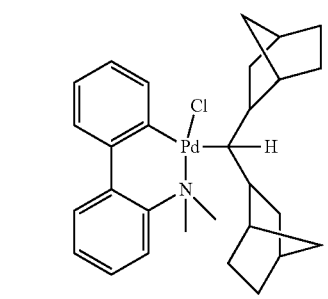
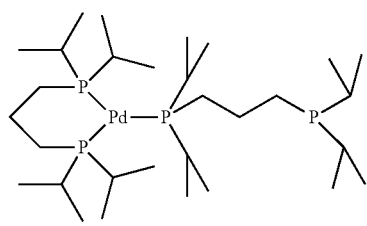
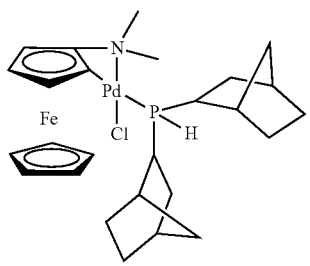
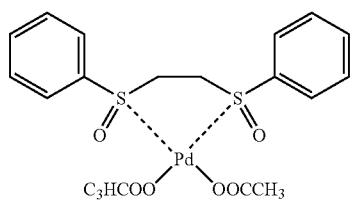
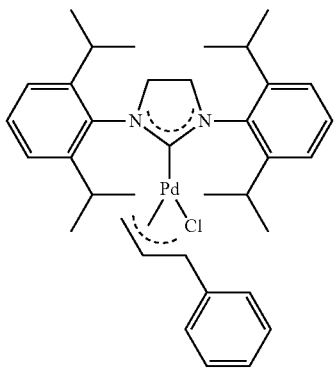
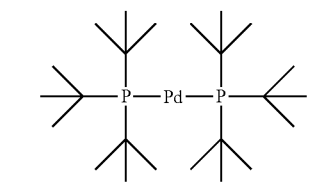
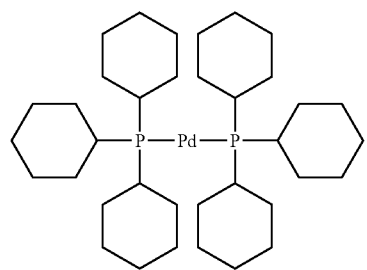
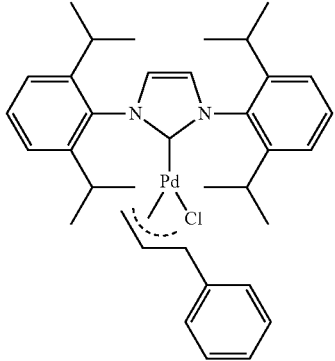

33
-continued
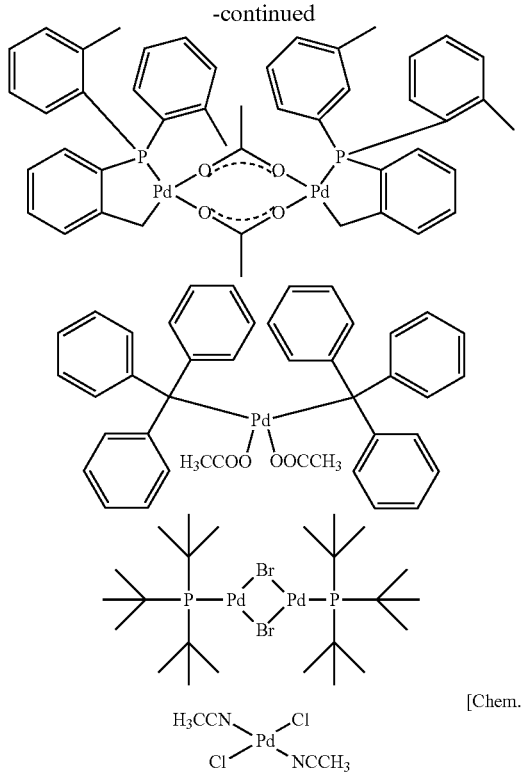
[Chem. 17]
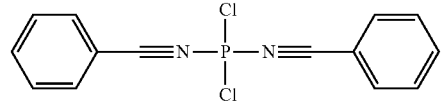
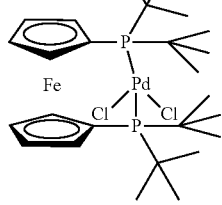
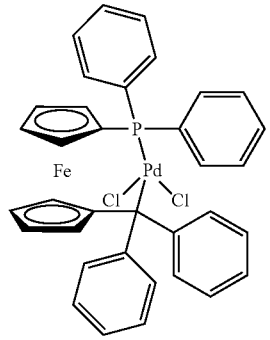
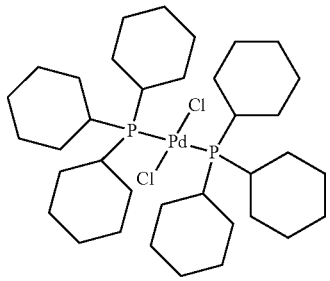
34
-continued
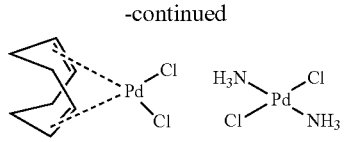
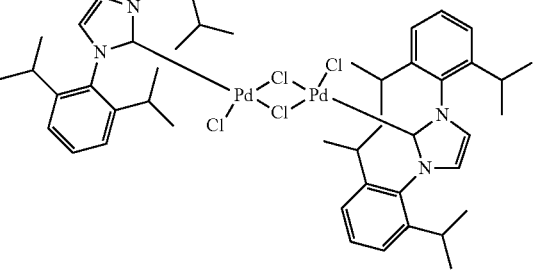
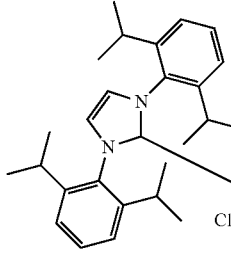
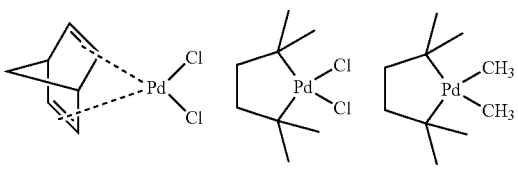
Pd$_3$(O$_2$CCH$_3$)$_6$Pd(OAc)2Pd(C$_5$H$_7$O$_2$)$_2$PdCl$_2$PdBr$_2$Pd(CN)$_2$PdI$_2$PdSO$_4$2H$_2$OPd(O$_2$CCF$_3$)$_2$[Pd(NH$_3$)$_4$](NO$_3$)$_2$[Pd(NH$_3$)$_4$](PdCl$_4$)Pd(CH$_3$CN)$_4$(BF$_4$)$_2$
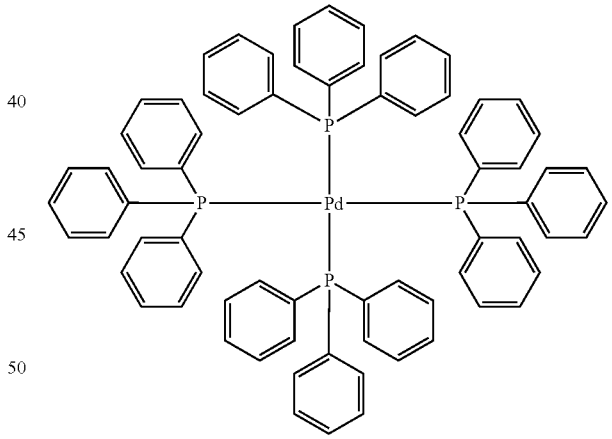
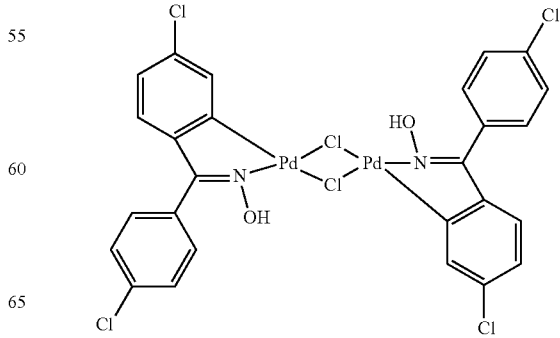

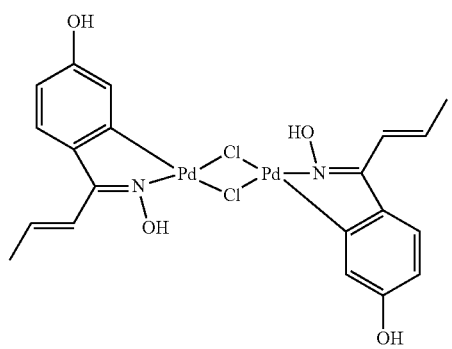
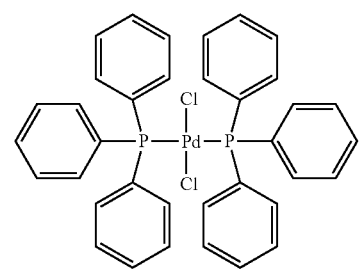
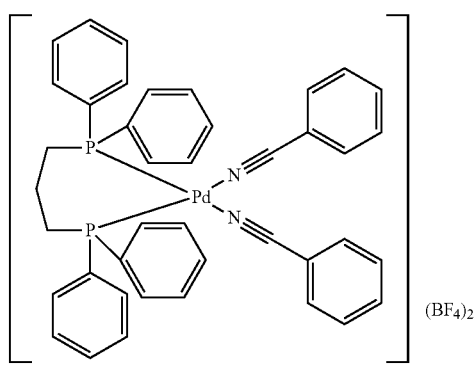
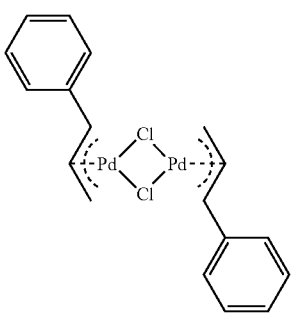
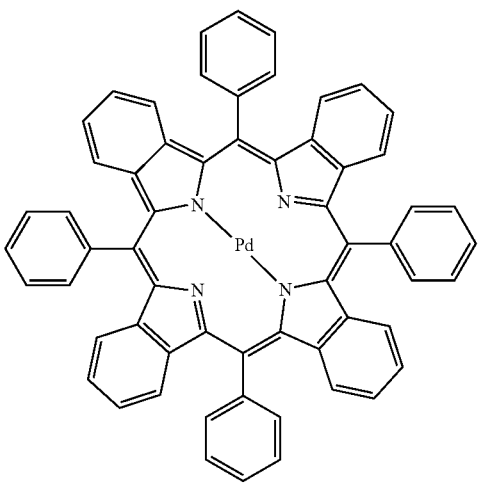
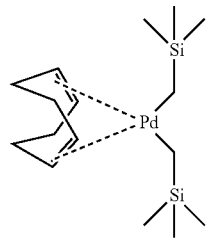
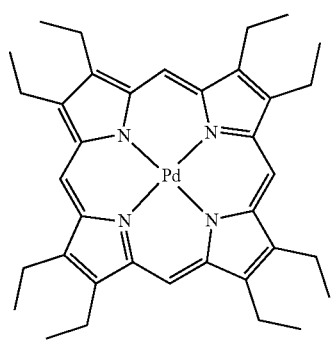
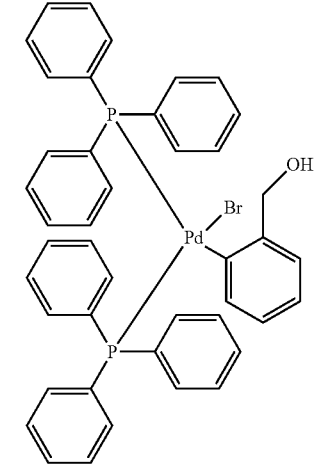
[Chem. 18]

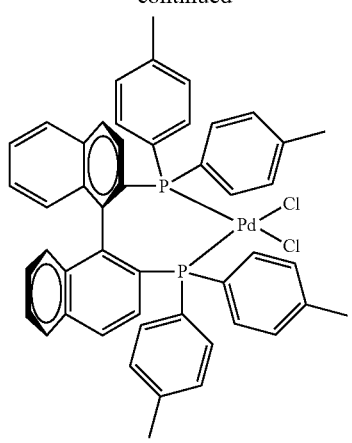
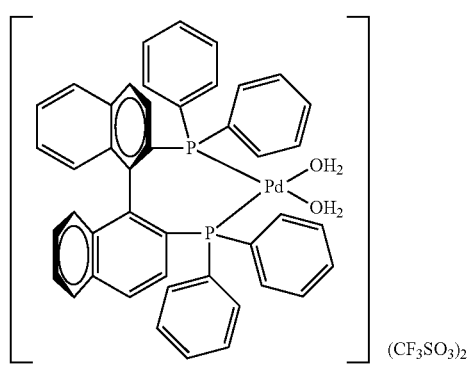
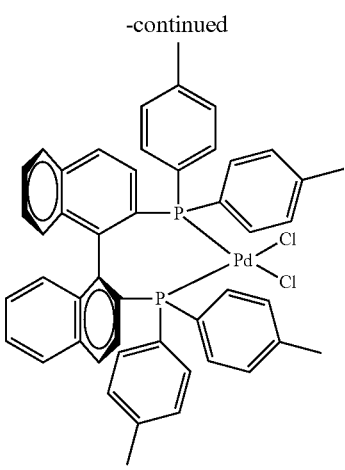
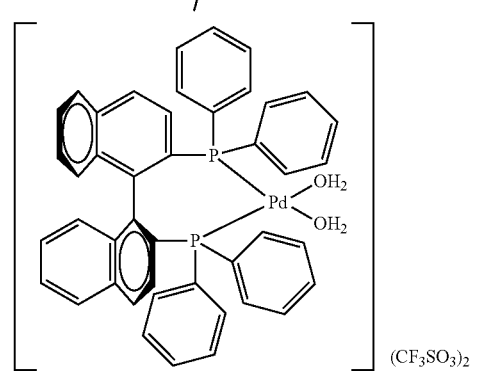
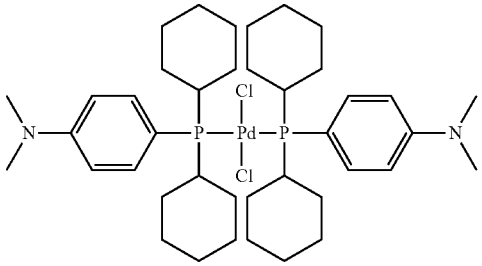
[Chem. 19]
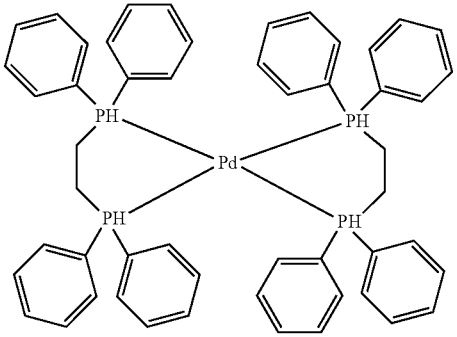
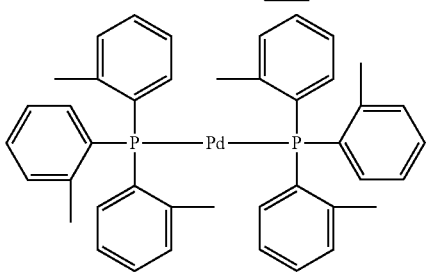

-continued
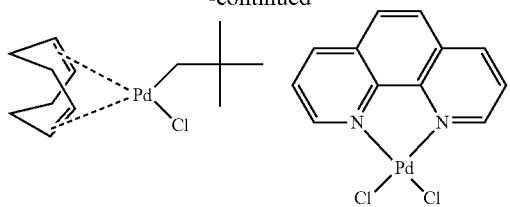
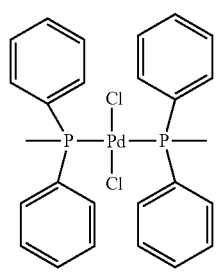
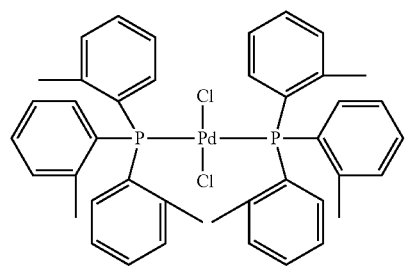
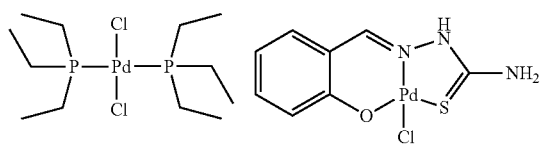
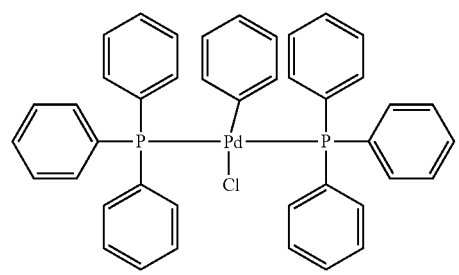
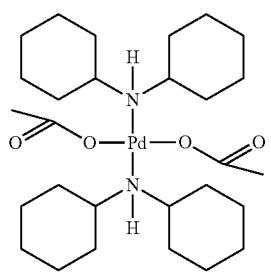
-continued
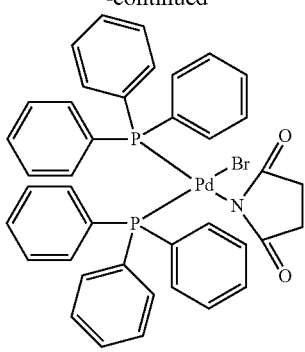
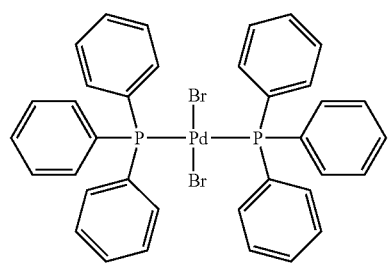
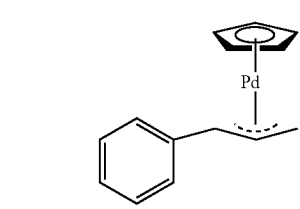
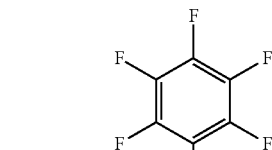
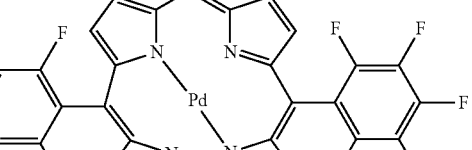
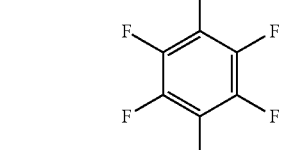
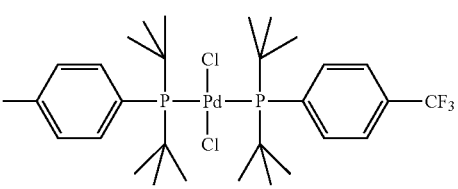

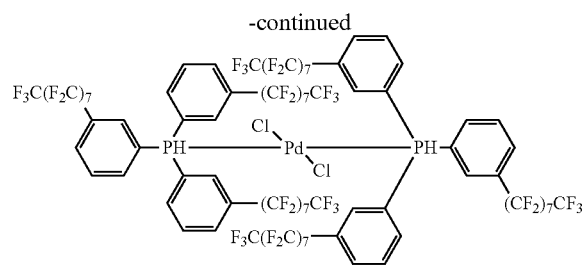

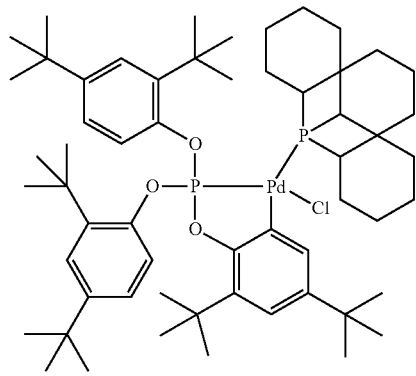

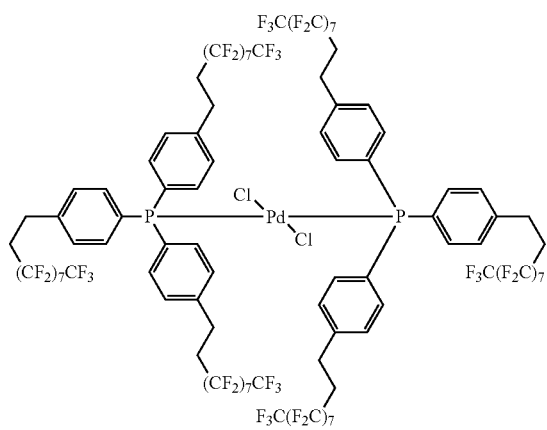

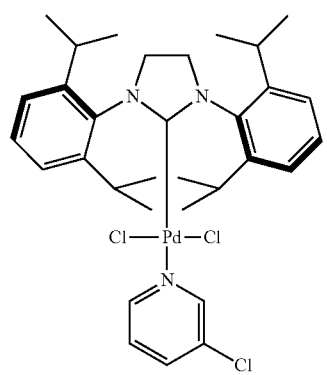

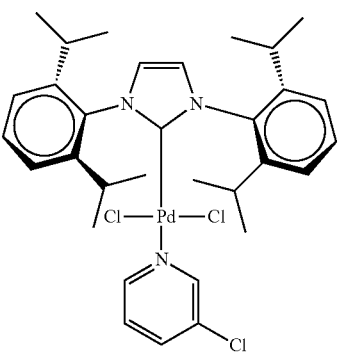

From the viewpoint of obtaining a cyclic conjugated polymer of high regioregularity in a high yield, the palladium catalyst is more preferably (1,3-diisopropylimidazol-2-ylidene)(3-chloropyridyl)palladium(II) chloride (PEPPSI™-IPr catalyst) (see the following formula).

[Chem. 21]

PEPPSi-iPr

The palladium catalysts described above may be used singly or in combination of two or more kinds.

The palladium catalyst is contained usually in an amount of 0.01 to 10% by mol, preferably 0.1 to 5% by mol, based on the monohalogenated substituted thiophene (100% by mol). When the amount of the palladium catalyst is in the above range, polythiophene of high regioregularity can be obtained in a high yield using the polymerization catalyst for a cyclic conjugated polymer.

The palladium catalyst can be easily synthesized by a publicly known process, and is also on the market inexpensively.

Together with the palladium catalyst, a compound that becomes a ligand providing a palladium catalyst of high activity, such as a phosphine ligand, may be contained, and by bringing about ligand exchange reaction between the palladium catalyst and the ligand compound in the system of the polymerization reaction for polythiophene, a palladium catalyst of higher activity may be formed.

As such a compound that becomes a ligand providing a palladium catalyst of high activity, there can be mentioned a bidentate neutral phosphine ligand compound or a monodentate neutral phosphine ligand compound, which forms the ligand previously described regarding the palladium catalyst. Specific examples thereof include the following compounds.

[Chem. 22]
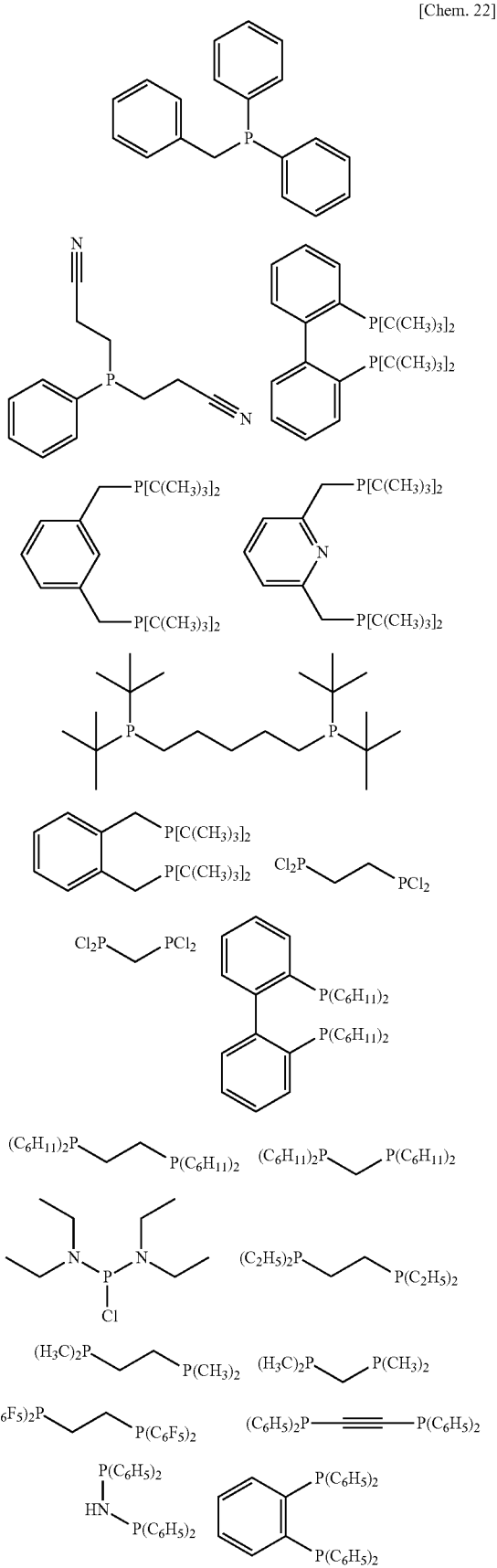
[Chem. 23]
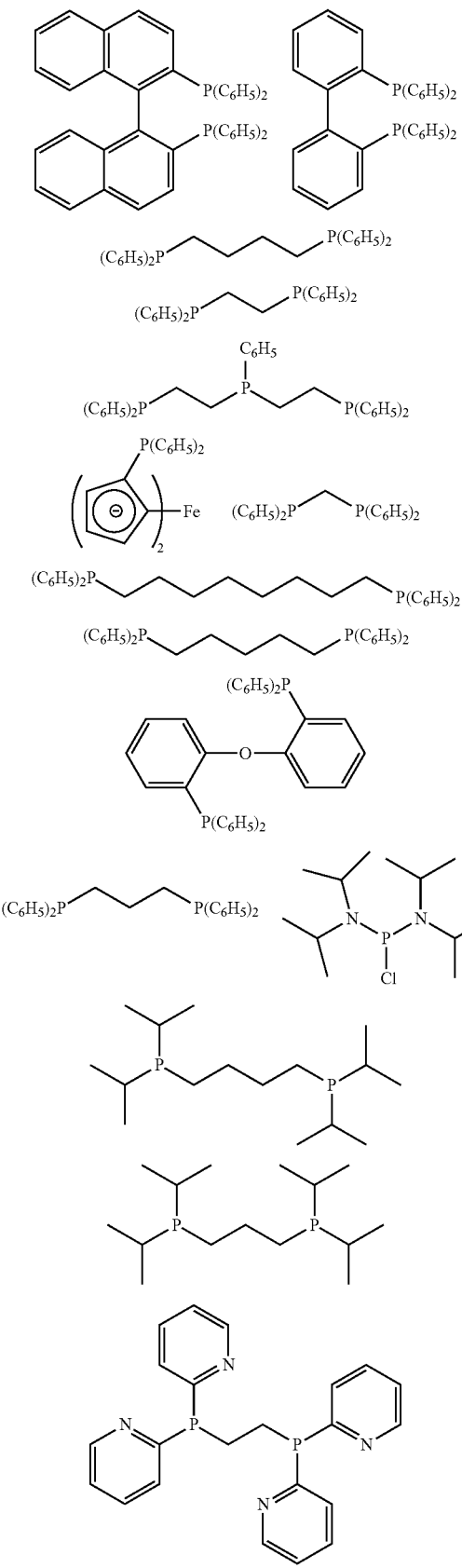

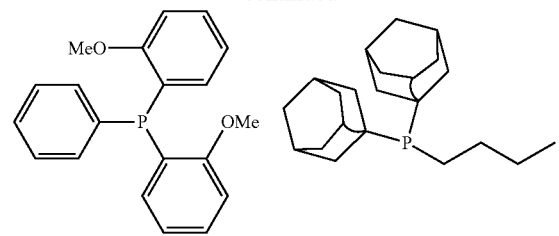
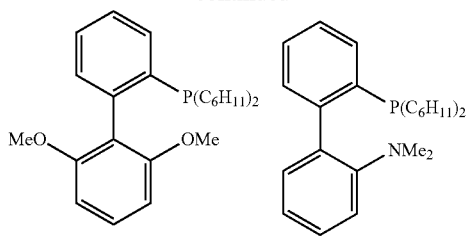
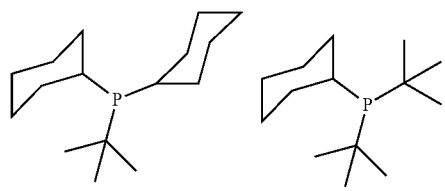
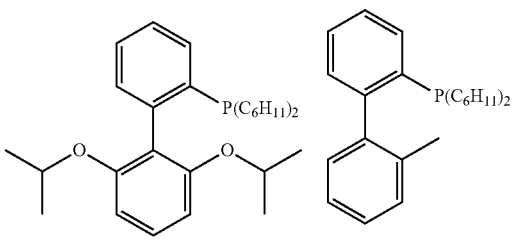
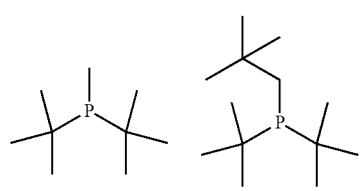
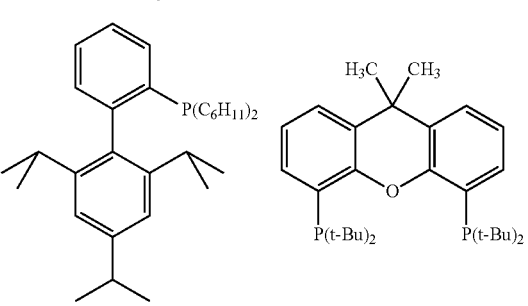
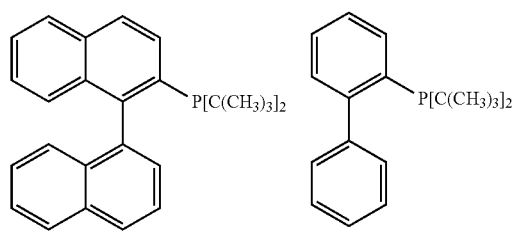
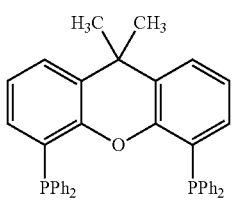
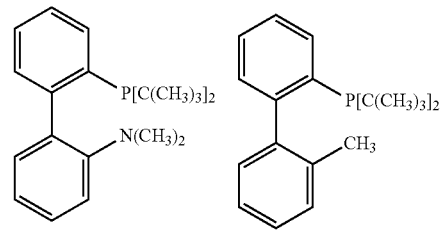
[Chem. 24]
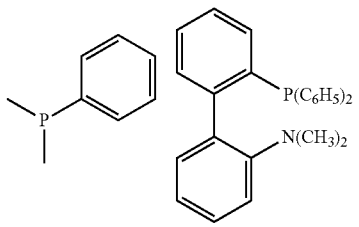
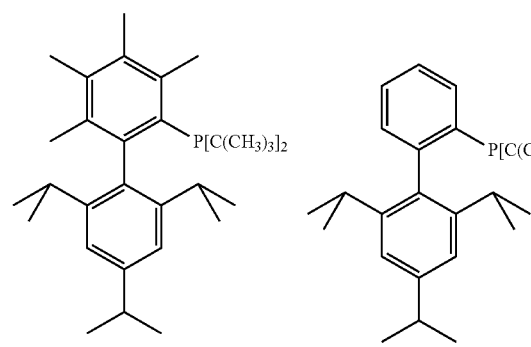
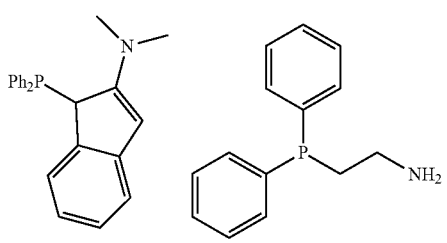
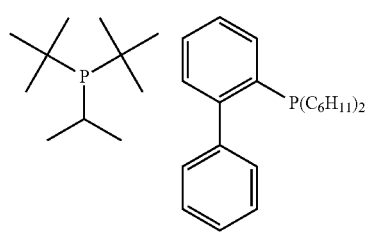
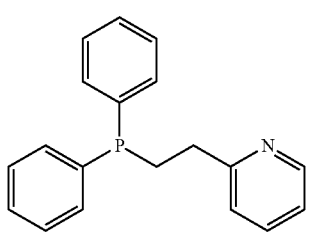

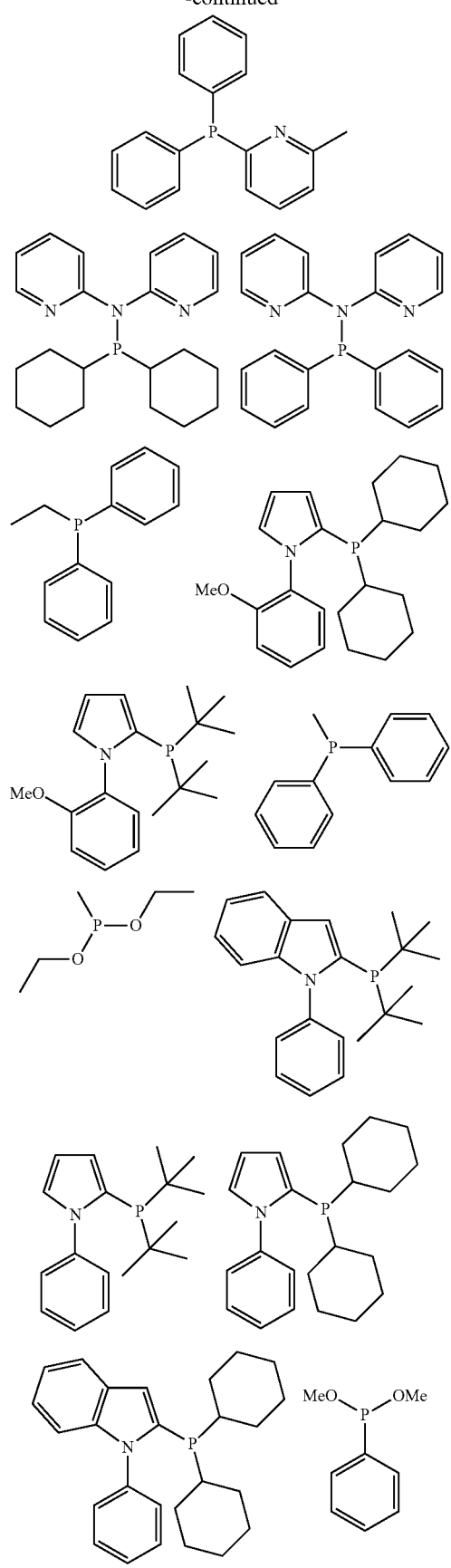
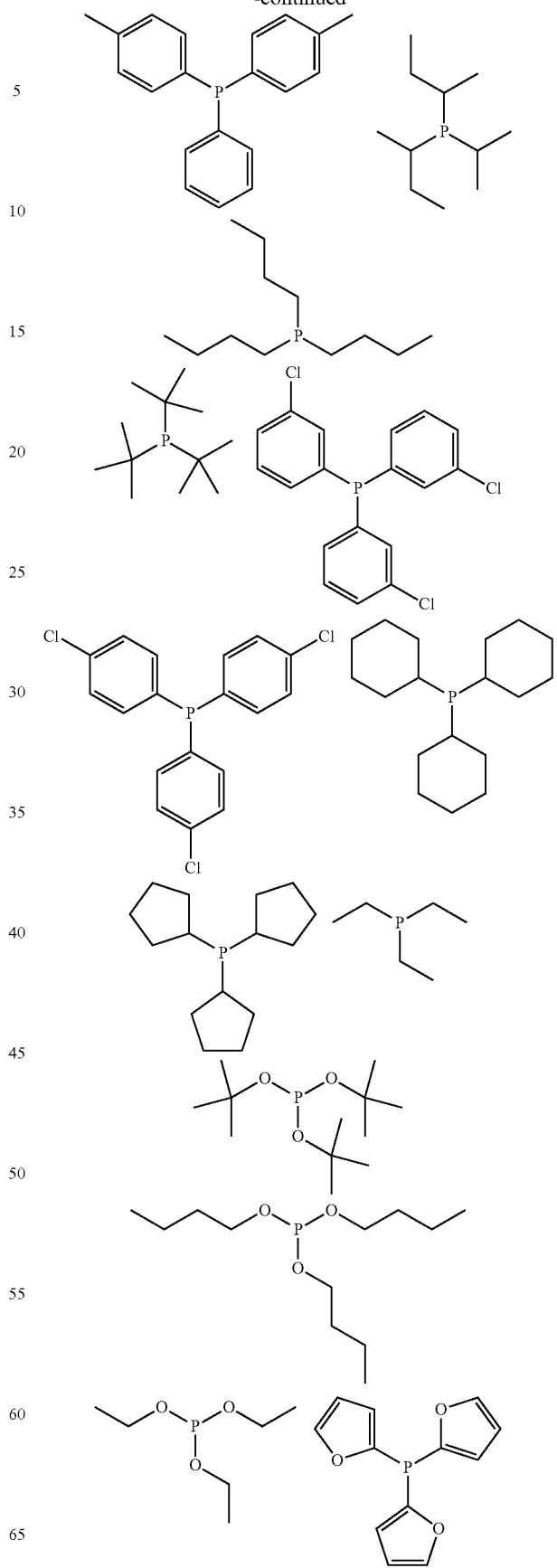

-continued
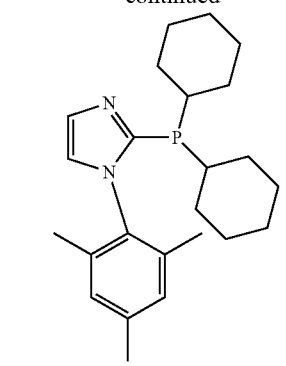
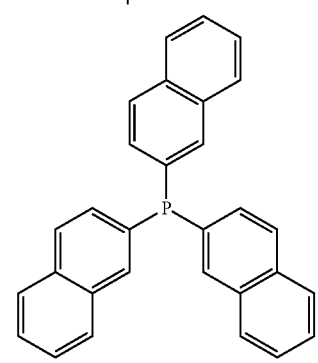
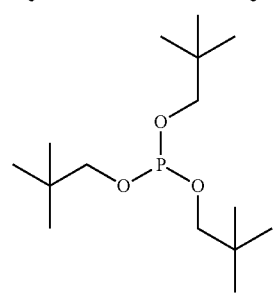
[Chem. 25]
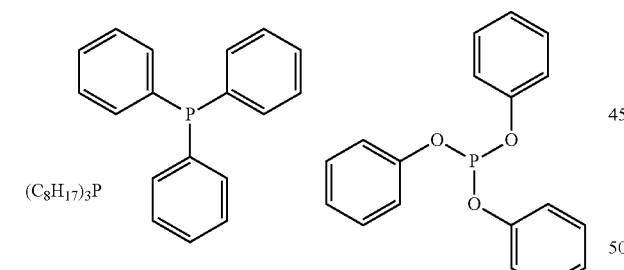
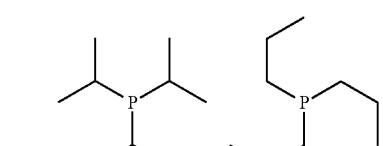
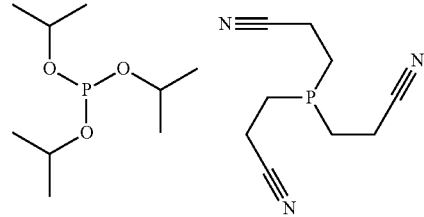
-continued
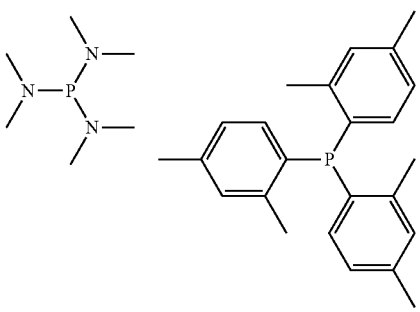
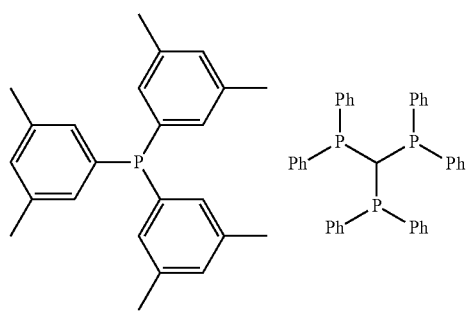
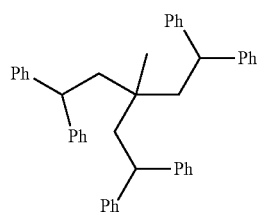
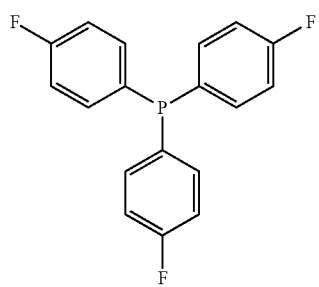
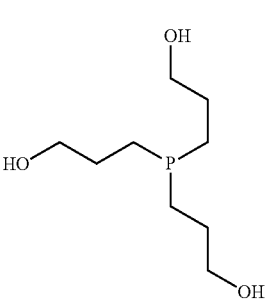

-continued

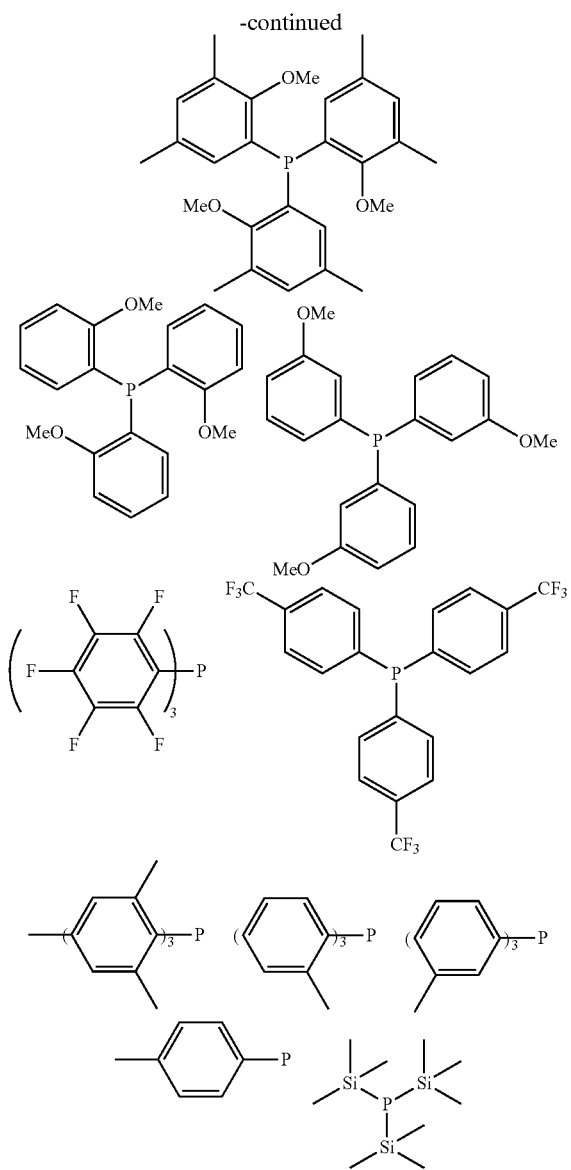

The above-described ligand compounds providing a palladium catalyst of high activity may be used singly, or may be used in combination of two or more kinds. The ligand compounds can be synthesized by publicly known processes, and are also on the market inexpensively.

In the transition metal catalyst related to the present invention, the ligand compound described above is contained usually in an amount of 5 to 200% by mol, preferably 50 to 150% by mol, based on the palladium catalyst (100% by mol).

In the present invention, the nickel catalyst and the palladium catalyst described above are almost equivalent to each other and can be used similarly to each other. That is to say, in the present invention, any one of the nickel catalyst and the palladium catalyst may be contained, or both of them may be contained. In the latter case, the proportions of the nickel catalyst and the palladium catalyst contained are arbitrary, and they are contained so that the total amount thereof may become usually 0.01 to 10% by mol, preferably 0.1 to 5% by mol, based on the monohalogenated cyclic conjugated compound (100% by mol).

<Arbitrary Components>

In the transition metal catalyst related to the present invention, for example, the following arbitrary components may be contained.

(Solvent)

The transition metal catalyst related to the present invention may contain a solvent. In particular, the polymerization reaction for polythiophene is generally carried out in a polymerization solvent. Therefore, when the components such as a nickel catalyst and a palladium catalyst are in the dissolved state in a solvent, they tend to be homogeneously dispersed in the polymerization solvent, and the reaction efficiency is enhanced.

Examples of the solvents include alcohol-based solvents, ether-based solvents, halogenated hydrocarbon-based solvents, aromatic solvents, nitrile-based solvents and sulfoxide-based solvents. These solvents may be used singly or may be used in combination of two or more kinds. Of these, tetrahydrofuran (THF) that is an ether-based solvent is preferable as the solvent from the viewpoint that the stability of the active monomer is compatible with the activity of the active monomer against the oxidative addition reaction on the catalyst.

(Halogen Trapping Agent)

For the purpose of accelerating the reaction by trapping a halogen of the raw material monomer (monohalogenated cyclic conjugated compound), the transition metal catalyst may contain a halogen trapping agent.

Examples of the halogen trapping agents include tertiary amines, such as triethylamine and pyridine, and alkali metal salts, such as sodium carbonate, potassium carbonate and cesium carbonate.

The halogen trapping agents may be used singly, or may be used in combination of two or more kinds.

The halogen trapping agent described above is contained usually in an amount of 10 to 200% by mol, preferably 50 to 100% by mol, based on the monohalogenated cyclic conjugated compound (100% by mol) that is a synthesis raw material of polythiophene.

[Preparation Process for Cyclic Conjugated Polymer]

It is thought that a proton of the monohalogenated cyclic conjugated compound is first eliminated by the deprotonation catalyst to thereby form an active monomer, and the transition metal catalyst accelerates C—C coupling between the halogen bond site and the deprotonated site in the active monomer to thereby form a cyclic conjugated polymer, as described above.

From the viewpoint of such mechanism of action, the preparation process for a cyclic conjugated polymer of the present invention is particularly suitable for preparing, for example, poly(3-substituted thiophene) of high regioregularity using monohalogenated 3-substituted thiophene of an asymmetrical structure as a reaction raw material. Of the polythiophenes described in the background art, this poly(3-substituted thiophene) is thought to be particularly promising as a material used for electrical parts because of high regioregularity.

In the preparation process for a cyclic conjugated polymer of the present invention, for example, 2-halogenated 3-substituted thiophene as a reaction raw material is allowed to react with a deprotonation catalyst first, and thereafter, a transition metal catalyst (or this catalyst together with the aforesaid compound that becomes a ligand) is added in a different stage. Therefore, the transition metal catalyst related to the present invention (or this catalyst together with the aforesaid compound that becomes a ligand) is stored separately from the secondary amine and the Grignard reagent for constituting the deprotonation catalyst by, for example, placing them in separate containers so that they can be used separately.

The polymerization reaction can be carried out at normal pressure. The reaction temperature is usually 5 to 100° C., preferably 10 to 60° C. That is to say, in the case where preparation of, for example, poly(substituted thiophene) is carried out in the present invention in addition to the reaction for forming the above active monomer, there is no need to control the temperature to a low-temperature region, and the polymerization reaction can be carried out at a mild and easily controllable reaction temperature throughout all the steps. The reaction time for the polymerization reaction is usually 0.5 to 72 hours, preferably 1 to 48 hours.

As previously described, the polymerization reaction is generally carried out in a polymerization solvent. The polymerization solvent is not specifically restricted provided that it dissolves monohalogenated substituted thiophene and is unreactive to the raw material and the catalyst components in the polymerization catalyst for polythiophene of the present invention. Specific examples thereof include the same solvents as mentioned as the reaction solvents in the reaction for forming the active monomer. The amount of the reaction solvent is the same as that previously described.

(End Capping)

When the polymerization reaction for a polymer is completed, a halogen atom and a deprotonated active site remain at the ends of the polymer. If they are left as they are, electric charge carrier trapping takes place, and lowering of carrier mobility of the resulting reaction product such as poly(substituted thiophene) and insufficient conductivity are sometimes brought about.

Then, in order not to bring about such disadvantages, end capping is preferably carried out to remove the halogen atom and the active site remaining at the ends.

Specifically, when the polymerization reaction is completed, an aliphatic Grignard reagent, a dialkyl Grignard reagent or reactive magnesium is added to convert the remaining halogen atom and active site to Grignard groups. Subsequently, by adding, for example, excess ω-haloalkane, alkyl end groups can be obtained.

The Grignard reagent is generally represented by $R^p MgX^q$ ($R^p$ is an alkyl group or the like, and $X^q$ is a halogen atom) or the like, and if $R^p$ is a reactive functional group, such as a hydroxyl group, an amine group, or a hydroxyl or amine group which is protected, end capping can be carried out by introducing such a reactive functional group into the end of poly(3-substituted thiophene). The end capping can be also carried out by using an organic lithium reagent instead of a Grignard reagent and then adding ω-haloalkane.

The end capping can be carried out in an arbitrary stage, such as before or after recovery of the reaction product such as poly(3-substituted thiophene) from the polymerization reaction mixture, or before or after purification of the reaction product.

Other detailed end capping methods have been disclosed in Japanese Translation of PCT International Application Publication No. 2007-501300, which is incorporated by reference in its entirety herein.

<Purification Step>

After completion of the above reaction, water is introduced into the reaction solution to terminate the reaction. Next, an excess amount of a poor solvent for the polymer, such as methanol, is introduced into the reaction solution to precipitate a polymer. The precipitate is filtered off, and the filter residue is recovered to obtain a polymer.

<Cyclic Conjugated Polymer>

By the preparation process for a cyclic conjugated polymer of the present invention described above, a cyclic conjugated polymer of high regioregularity, particularly preferably poly (3-substituted thiophene), can be obtained in a high yield.

Specifically, the yield of poly(3-substituted thiophene) is usually 30 to 99%, preferably 70 to 99%, and is superior to that in a conventional preparation process for poly(3-substituted thiophene).

The regioregularity is usually 94 to 100%, and is preferably as high as 98 to 100%. The regioregularity can be calculated based on the $^1$H NMR spectrum measurement, and as the calculation methods (evaluation methods), there can be mentioned broadly divided two methods.

One method is a method of utilizing a signal derived from a proton at the 4-position of a thiophene ring in poly(3-substituted thiophene), and in this method, a signal (A) corresponding to a proton at the 4-position of a thiophene ring derived from the regioregular 2,5' (head-to-tail) connection, a signal (B) corresponding to a proton at the 4-position of a thiophene ring derived from the regioirregular 2,2' (head-to-head) connection and a signal (C) corresponding to a proton at the 4-position of a thiophene ring derived from the 5,5' (tail-to-tail) connection are used. The regioregularity can be estimated by an integral ratio of the signal (A) to the signals (A+B+C) corresponding to all the protons at the 4-positions of thiophene rings in the polymer.

The other method is a method of utilizing a signal derived from a proton of an α-methylene group, though this method is limited to the case of poly(3-substituted thiophene) having an α-methylene group as a substituent at the 3-position of a thiophene ring, and in this method, a signal (A') corresponding to an α-methylene proton of a substituent at the 3-position of a thiophene ring derived from the regioregular 2,5' (head-to-tail) connection, a signal (B') corresponding to an α-methylene proton of a substituent at the 3-position of a thiophene ring derived from the regioirregular 2,2' (head-to-head) connection and a signal (C') corresponding to an α-methylene proton of a substituent at the 3-position of a thiophene ring derived from the 5,5' (tail-to-tail) connection are used. The regioregularity can be estimated by an integral ratio of the signal (A') to the signals (A'+B'+C') corresponding to all the protons of α-methylenes of substituents at the 3-positions of thiophene rings in the polymer.

The number-average molecular weight of poly(substituted thiophene) prepared by the preparation process for poly(substituted thiophene) of the present invention is usually 2,000 to 700,000, preferably 20,000 to 400,000, and the poly(substituted thiophene) can exhibit sufficient strength when it is used for electric parts, etc. In the present specification, the number-average molecular weight is a number-average molecular weight in terms of standard polystyrene as measured by GPC. The same shall apply to the weight-average molecular weight.

The number-average molecular weight (and the weight-average molecular weight) of the poly(substituted thiophene) can be controlled by changing the types of the nickel catalyst and/or the palladium catalyst and the amounts thereof in the polymerization catalyst for polythiophene of the present invention. The molecular weights are specifically as follows. Depending upon the type (difference in chemical structure) of the catalyst, the formation ratio of the polymerization initiation active species formed in the initial stage of the polymerization varies. It is thought that the formation ratio of the polymerization initiation active species dependent upon the type of the catalyst is influenced by a difference in steric structure of a ligand to constitute the catalyst and in electronic structure thereof, such as electron accepting property or electron donating property, and is influenced by a difference in steric structure as the total of catalyst molecules and in intensity of electron accepting property and electron donating property of the central nickel atom or palladium atom. The formation ratio of the polymerization initiation active species varies depending upon the selection of a ligand to constitute the catalyst molecule, and is further influenced also by a difference in activity of the active monomer. Therefore, the formation ratio is not determined unambiguously. However, it is thought that when the formation ratio of the polymerization initiation active species is high, the number of molecules growing as a polymer becomes large, and hence, the polymer is led to a low-molecular weight, but when the formation ratio is low, the polymer is led to a high-molecular weight contrarily.

In the case of using a catalyst having the same chemical structure, the formation ratio of the polymerization initiation active species is the same. Therefore, the molecular weight of the resulting polymer depends upon the amount of the catalyst added, and it is thought that when the amount of the catalyst added is large, the polymerization initiation active species increases, and hence, the polymer is led to a low-molecular weight, but when the amount of the catalyst added is small, the polymer is led to a high-molecular weight contrarily.

The molecular weight distribution of the poly(substituted thiophene) is usually 1.10 to 5.00, preferably 1.10 to 3.50, and the poly(substituted thiophene) has a narrow molecular weight equivalent to that of poly(3-substituted thiophene) obtained by a conventional preparation process for poly(3-substituted thiophene). Therefore, the poly(substituted thiophene) obtained by the preparation process of the present invention, particularly preferably poly(3-substituted thiophene), has excellent self-assembly property on the same level as that of poly(3-substituted thiophene) prepared by a conventional process. On that account, it exhibits excellent electric conductivity and is preferably used for electric parts, specifically, organic thin film solar cells, organic thin film transistors, photoelectric conversion materials, organic EL materials, diodes, triodes, electrooptical displays, reflection films, nonlinear optical materials, etc.

When the poly(substituted thiophene) is applied to such uses, it may contain one or more of other appropriate components, such as sensitizer, stabilizer, inhibitor, chain transfer agent, reaction co-monomer or co-oligomer, surface active compound, lubricant, wetting agent, dispersing agent, hydrophobizing agent, adhesive, flow improver, diluent, colorant, dye, pigment and dopant. These components can be added by dissolving poly(substituted thiophene) in an appropriate organic solvent, then adding them to the resulting solution and then evaporating the organic solvent.

The molecular weight distribution of the poly(substituted thiophene) can be controlled by a feed rate of the active monomer obtained by dehalogenating the monohalogenated substituted thiophene and by the oxidative addition and the reductive elimination of the nickel catalyst and/or the palladium catalyst.

<Optional Steps>

In the preparation process for a cyclic conjugated polymer of the present invention, other steps, such as a step of purifying the cyclic conjugated polymer prepared, may be carried out in addition to the step of forming an active monomer and the step of forming a cyclic conjugated polymer, as described in the description of the end capping. Specifically, in addition to the purification step, a step of removing a catalyst residue may be carried out thereafter, and further, for the purpose of removing a low-molecular weight polymer, a step comprising subjecting the recovered polymer to liquid separation using an organic solvent, in which the polymer is soluble and which has a low partition coefficient into water, and water to recover an organic solvent layer, performing dehydration, then distilling off the organic solvent to obtain a solid and drying the solid may be carried out.

For the same purpose as above, a step comprising subjecting the recovered polymer to Soxhlet extraction with a poor solvent for the polymer, such as methanol or hexane, removing the extract, then subjecting the polymer to Soxhlet extraction with a good solvent showing polymer dissolution property, recovering the extract and drying it may be further carried out.

For the same purpose as above, a step of purifying the recovered polymer through column chromatography using, as a developing solvent, a solvent in which the polymer is soluble and which is developable by TLC (thin layer chromatography) may be carried out.

EXAMPLES

The present invention is described below in more detail with reference to the following examples, but it should be construed that the present invention is in no way limited to those examples.

Example 1

In a 20 ml Schlenk flask purged with nitrogen, 2-chloro-3-hexylthiophene (1.0 mmol) dissolved in 10 ml of THF, dicylohexylamine (0.1 mmol, 10% by mol based on THF (100% by mol)) and ethylmagnesium chloride (1.0 mmol) were placed. With promoting deprotonation reaction, $NiCl_2(PPh_3)$ iPr (1.0% by mol) was introduced into the reaction solution, and metallization reaction was performed at 60° C. for 1 hour. Thereafter, polymerization was performed at room temperature for 10 hours to obtain a polymer.

Measurement of molecular weights (weight-average molecular weight Mw and number-average molecular weight Mn) of the resulting polymer was carried out relative to standard polystyrene by means of GPC using chloroform as a mobile phase and using Tosoh TSKgel GMHHR-H and TSK-GEL G2500HHR as columns at a flow rate of 1 ml/min.

Evaluation of regioregularity of the resulting polymer was carried out by a method of utilizing a signal in a $^1H$ NMR spectrum, said signal being derived from a proton of an α-methylene group of a substituent at the 3-position in poly(3-substituted thiophene). In the measurement of the $^1H$ NMR spectrum, JNM-ECX500 manufactured by JEOL, Ltd. was used.

Yield: 70%
Molecular weight: Mn 14900, Mw/Mn 1.21
Regioregularity: 98%

Example 2

A polymer was obtained in the same manner as in Example 1, except that 2-chloro-3-(n-octyl)thiophene was used instead of 2-chloro-3-hexylthiophene.

Yield: 76%
Molecular weight: Mn 23100, Mw/Mn 1.29
Regioregularity: 99%

Example 3

A polymer was obtained in the same manner as in Example 1, except that 2-chloro-3-hexyloxymethylthiophene was used instead of 2-chloro-3-hexylthiophene.

Yield: 84%
Molecular weight: Mn 17000, Mw/Mn 1.31
Regioregularity: 99%

The invention claimed is:

1. A preparation process for a cyclic conjugated polymer, comprising:
 deprotonating a monohalogenated cyclic conjugated compound of a 5- to 7-membered ring using a deprotonation catalyst comprising secondary amine represented by $R^1$—NH—$R^2$ (1) (in the formula (1), $R^1$ and $R^2$ are the same or different and are each a branched or cyclic alkyl group of 1 to 15 carbon atoms or a phenyl group) and a Grignard reagent represented by $R^3$—MgX (2) (in the formula (2), X is a halogen atom selected from chlorine, bromine and iodine, and $R^3$ is a straight-chain or branched alkyl group of 1 to 6 carbon atoms), and
 polymerizing the deprotonated monohalogenated cyclic conjugated compound.

2. The preparation process for a cyclic conjugated polymer as claimed in claim 1, wherein the deprotonated monohalogenated cyclic conjugated compound is polymerized in the presence of a transition metal catalyst.

3. The preparation process for a cyclic conjugated polymer as claimed in claim 1, wherein the monohalogenated cyclic conjugated compound is a monohalogenated carbocyclic conjugated compound or a monohalogenated heterocyclic conjugated compound.

4. The preparation process for a cyclic conjugated polymer as claimed in claim 1, wherein the monohalogenated cyclic conjugated compound has a 5- to 7-membered ring-containing heterocyclic structure and further has an electron donating or electron withdrawing substituent.

5. The preparation process for a cyclic conjugated polymer as claimed in claim 4, wherein the electron donating substituent is an alkyl group, an alkoxy group, an alkenyl group or an alkynyl group.

6. The preparation process for a cyclic conjugated polymer as claimed in claim 4, wherein the electron withdrawing substituent is a group wherein hydrogen of an alkyl group, an alkoxy group, an alkenyl group or an alkynyl group has been replaced with fluorine.

7. The preparation process for a cyclic conjugated polymer as claimed in claim 1, wherein the monohalogenated cyclic conjugated compound is a monochlorocyclic conjugated compound or a monobromocyclic conjugated compound.

8. The preparation process for a cyclic conjugated polymer as claimed in claim 1, wherein the secondary amine represented by the formula (1) is dicyclohexylamine, dimethylamine, diethylamine, dipropylamine, diisopropylamine, dibutylamine, dipentylamine, dihexylamine, diheptylamine, dioctylamine, dinonylamine, didecylamine, diundecylamine, didodecylamine, diphenylamine or 2,2,6,6-tetramethylpiperidine.

9. The preparation process for a cyclic conjugated polymer as claimed in claim 1, wherein the Grignard reagent represented by the formula (2) is a substance obtained by allowing methyl chloride, methyl bromide, methyl iodide, ethyl chloride, ethyl bromide, ethyl iodide, isopropyl chloride, isopropyl bromide, isopropyl iodide, butyl chloride, butyl bromide, butyl iodide, cyclohexyl bromide, cyclopentyl bromide, cyclopropylpropyl bromide, 2,5-dimethylphenyl bromide, heptyl bromide, octyl bromide, pentadecyl bromide, phenyl chloride, phenyl bromide, phenyl iodide, ortho-tolyl bromide, meta-tolyl bromide, para-tolyl bromide, vinyl bromide, benzyl chloride, benzyl bromide or benzyl iodide to react with metallic magnesium in anhydrous ether.

10. The preparation process for a cyclic conjugated polymer as claimed in claim 1, wherein the secondary amine represented by the formula (1) is added in a catalytic amount.

11. The preparation process for a cyclic conjugated polymer as claimed in claim 2, wherein the transition metal catalyst is a nickel catalyst and/or a palladium catalyst.

* * * * *